(12) United States Patent
Teich et al.

(10) Patent No.: US 9,807,319 B2
(45) Date of Patent: Oct. 31, 2017

(54) WEARABLE IMAGING DEVICES, SYSTEMS, AND METHODS

(71) Applicant: FLIR Systems, Inc., Wilsonville, OR (US)

(72) Inventors: Andrew C. Teich, West Linn, OR (US); Jeffrey D. Frank, Santa Barbara, CA (US); Nicholas Högasten, Santa Barbara, CA (US); Theodore R. Hoelter, Goleta, CA (US); Katrin Strandemar, Rimbo (SE); Pierre Boulanger, Goleta, CA (US); Eric A. Kurth, Santa Barbara, CA (US); Barbara Sharp, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 322 days.

(21) Appl. No.: 14/506,430

(22) Filed: Oct. 3, 2014

(65) Prior Publication Data

US 2015/0085133 A1    Mar. 26, 2015

Related U.S. Application Data

(63) Continuation-in-part of application No. 13/940,232, filed on Jul. 11, 2013, and a continuation-in-part of
(Continued)

(51) Int. Cl.
*H04N 7/18* (2006.01)
*H04N 5/33* (2006.01)
(Continued)

(52) U.S. Cl.
CPC ............. *H04N 5/33* (2013.01); *H04N 5/2253* (2013.01); *H04N 5/2257* (2013.01);
(Continued)

(58) Field of Classification Search
CPC ....................................................... H04N 5/33
(Continued)

(56) References Cited

U.S. PATENT DOCUMENTS

| 2,764,055 | A |   | 9/1956 | Clemens et al. |
| 6,055,048 | A | * | 4/2000 | Langevin ............... A61H 3/061 |
|           |   |   |        | 356/237.1 |

(Continued)

FOREIGN PATENT DOCUMENTS

| CA | 2764055 | 7/2012 |
| CN | 2874947 | 2/2007 |

(Continued)

OTHER PUBLICATIONS

Darpa, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

(Continued)

*Primary Examiner* — Jeremaiah C Hallenbeck-Huber
(74) *Attorney, Agent, or Firm* — Haynes and Boone, LLP

(57) ABSTRACT

Wearable systems with thermal imaging capabilities may be provided for detecting the presence and location of persons or animals in an environment surrounding the system in accordance with an embodiment. A wearable system may include a wearable structure such as a helmet with a plurality of imaging modules mounted to the wearable structure. An imaging module may include one or more imaging components such as infrared imaging modules and visible light cameras. Thermal images captured using the infrared imaging modules may be used to detect the presence of a person in the thermal images. The wearable imaging system may include one or more alert components that alert the wearer when a person is detected in the thermal images. The alert components may be used to generate a location-specific alert (Continued)

that alerts the wearer to the location of the detected person. A wearable imaging system may be a multidirectional threat monitoring helmet.

19 Claims, 26 Drawing Sheets

Related U.S. Application Data application No. 14/137,573, filed on Dec. 20, 2013, which is a continuation-in-part of application No. 13/043,123, filed on Mar. 8, 2011, now Pat. No. 8,766,808, application No. 14/506,430, which is a continuation-in-part of application No. 14/101,245, filed on Dec. 9, 2013, now Pat. No. 9,706,139, which is a continuation of application No. PCT/US2012/041744, filed on Jun. 8, 2012, application No. 14/506,430, which is a continuation-in-part of application No. 14/099,818, filed on Dec. 6, 2013, now Pat. No. 9,723,227, which is a continuation of application No. PCT/US2012/041749, filed on Jun. 8, 2012, application No. 14/506,430, which is a continuation-in-part of application No. 14/101,258, filed on Dec. 9, 2013, now Pat. No. 9,723,228, which is a continuation of application No. PCT/US2012/041739, filed on Jun. 8, 2012, application No. 14/506,430, which is a continuation-in-part of application No. 13/437,645, filed on Apr. 2, 2012, now Pat. No. 9,171,361, which is a continuation-in-part of application No. 13/105,765, filed on May 11, 2011, now Pat. No. 8,565,547, said application No. 13/437,645 is a continuation-in-part of application No. 12/766,739, filed on Apr. 23, 2010, now Pat. No. 8,520,970, said application No. 13/105,765 is a continuation of application No. PCT/EP2011/056432, filed on Apr. 21, 2011, and a continuation-in-part of application No. 12/766,739, said application No. PCT/EP2011/056432 is a continuation-in-part of application No. 12/766,739, application No. 14/506,430, which is a continuation-in-part of application No. 14/138,058, filed on Dec. 21, 2013, and a continuation-in-part of application No. 14/299,987, filed on Jun. 9, 2014, now Pat. No. 9,083,897, which is a continuation of application No. 12/477,828, filed on Jun. 3, 2009, now Pat. No. 8,749,635, application No. 14/506,430, which is a continuation-in-part of application No. 14/138,040, filed on Dec. 21, 2013, now Pat. No. 9,451,183, and a continuation-in-part of application No. 14/138,052, filed on Dec. 21, 2013, now Pat. No. 9,635,285.

(60) Provisional application No. 61/886,543, filed on Oct. 3, 2013, provisional application No. 61/670,824, filed on Jul. 12, 2012, provisional application No. 61/745,193, filed on Dec. 21, 2012, provisional application No. 61/312,146, filed on Mar. 9, 2010, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011, provisional application No. 61/473,207, filed on Apr. 8, 2011, provisional application No. 61/748,018, filed on Dec. 31, 2012, provisional application No. 61/792,582, filed on Mar. 15, 2013, provisional application No. 61/746,069, filed on Dec. 26, 2012, provisional application No. 61/793,952, filed on Mar. 15, 2013, provisional application No. 61/746,074, filed on Dec. 26, 2012.

(51) Int. Cl.
  *H04N 5/225* (2006.01)
  *H04N 5/232* (2006.01)

(52) U.S. Cl.
  CPC ......... *H04N 5/23209* (2013.01); *H04N 5/332* (2013.01); *H04N 7/18* (2013.01); *H04N 7/181* (2013.01)

(58) Field of Classification Search
  USPC ....................................................... 348/143
  See application file for complete search history.

(56) References Cited

U.S. PATENT DOCUMENTS

| | | | |
|---|---|---|---|
| 6,297,794 B1 | 10/2001 | Tsubouchi et al. | |
| 6,330,371 B1* | 12/2001 | Chen | G01S 3/7864 |
| | | | 250/347 |
| 6,337,683 B1 | 1/2002 | Gilbert et al. | |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,456,261 B1* | 9/2002 | Zhang | A42B 3/042 |
| | | | 345/7 |
| 6,633,231 B1 | 10/2003 | Okamoto et al. | |
| 6,681,120 B1 | 1/2004 | Kim | |
| 6,759,949 B2 | 7/2004 | Miyahara | |
| 6,844,990 B2 | 1/2005 | Artonne et al. | |
| 6,883,054 B2 | 4/2005 | Yamaguchi et al. | |
| 6,911,652 B2 | 6/2005 | Walkenstein | |
| 7,050,107 B1 | 5/2006 | Frank et al. | |
| D524,785 S | 7/2006 | Huang | |
| 7,084,857 B2 | 8/2006 | Lieberman et al. | |
| 7,130,490 B2 | 10/2006 | Elder et al. | |
| 7,208,733 B2 | 4/2007 | Mian et al. | |
| 7,214,939 B1* | 5/2007 | Wong | G01J 3/108 |
| | | | 250/339.01 |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim | |
| 7,333,832 B2 | 2/2008 | Tsai et al. | |
| 7,377,835 B2 | 5/2008 | Parkulo et al. | |
| 7,420,663 B2 | 9/2008 | Wang et al. | |
| 7,453,064 B2 | 11/2008 | Lee | |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,595,904 B2 | 9/2009 | Lapstun et al. | |
| 7,616,877 B2 | 11/2009 | Zarnowski et al. | |
| 7,620,265 B1 | 11/2009 | Wolff et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,733,371 B1 | 6/2010 | Monroe | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,872,574 B2 | 1/2011 | Betts et al. | |
| 7,900,842 B2 | 3/2011 | Silverbrook et al. | |
| 7,903,152 B2 | 3/2011 | Kim | |
| 7,947,222 B2 | 5/2011 | Bae et al. | |

(56) References Cited

U.S. PATENT DOCUMENTS

| | | |
|---|---|---|
| 7,960,700 B2 | 6/2011 | Craig et al. |
| 8,275,413 B1 | 9/2012 | Fraden et al. |
| 8,305,424 B2 | 11/2012 | Inaguma |
| 8,305,577 B2 | 11/2012 | Kivioja et al. |
| 8,345,226 B2 | 1/2013 | Zhang |
| 8,537,343 B2 | 9/2013 | Zhang |
| 8,781,420 B2 | 7/2014 | Schlub et al. |
| 8,825,112 B1 | 9/2014 | Fraden et al. |
| 2002/0006337 A1 | 1/2002 | Kimura et al. |
| 2002/0058352 A1 | 5/2002 | Jacksen et al. |
| 2002/0122036 A1 | 9/2002 | Sasaki |
| 2002/0135571 A1 | 9/2002 | Klocek et al. |
| 2002/0140542 A1 | 10/2002 | Prokoski et al. |
| 2002/0149600 A1 | 10/2002 | Van Splunter et al. |
| 2003/0007193 A1 | 1/2003 | Sato et al. |
| 2003/0112871 A1 | 6/2003 | Demos |
| 2003/0122957 A1 | 7/2003 | Emme |
| 2003/0223623 A1 | 12/2003 | Gutta et al. |
| 2004/0047518 A1 | 3/2004 | Tiana |
| 2004/0101298 A1 | 5/2004 | Mandelbaum et al. |
| 2004/0127156 A1 | 7/2004 | Park |
| 2004/0128070 A1 | 7/2004 | Schmidt et al. |
| 2004/0157612 A1 | 8/2004 | Kim |
| 2004/0165788 A1 | 8/2004 | Perez et al. |
| 2004/0169860 A1 | 9/2004 | Jung et al. |
| 2004/0207036 A1 | 10/2004 | Ikeda |
| 2004/0256561 A1 | 12/2004 | Beuhler et al. |
| 2005/0030314 A1 | 2/2005 | Dawson |
| 2005/0067852 A1 | 3/2005 | Jeong |
| 2005/0068333 A1 | 3/2005 | Nakahashi et al. |
| 2005/0089241 A1 | 4/2005 | Kawanishi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0039686 A1 | 2/2006 | Soh et al. |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0210249 A1 | 9/2006 | Seto |
| 2006/0234744 A1 | 10/2006 | Sung et al. |
| 2006/0238877 A1* | 10/2006 | Ashkenazi .......... G02B 27/0093 359/630 |
| 2006/0240867 A1 | 10/2006 | Wang et al. |
| 2006/0279758 A1 | 12/2006 | Myoki |
| 2006/0285907 A1 | 12/2006 | Kang et al. |
| 2006/0289762 A1* | 12/2006 | Hackney .............. A62C 99/009 250/338.1 |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0228159 A1* | 10/2007 | Kashiwa ............ G06F 17/30247 235/380 |
| 2007/0235634 A1* | 10/2007 | Ottney ...................... G01J 5/02 250/214 VT |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0030580 A1* | 2/2008 | Kashiwa .......... G08B 13/19621 348/158 |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0166061 A1* | 7/2008 | Hohenberger ...... H04N 5/23293 382/254 |
| 2008/0170082 A1 | 7/2008 | Kim |
| 2008/0170119 A1* | 7/2008 | McCann ............... G02B 27/017 348/113 |
| 2008/0218474 A1 | 9/2008 | Ahn et al. |
| 2008/0248833 A1 | 10/2008 | Silverbrook et al. |
| 2008/0259181 A1 | 10/2008 | Yamashita et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0109286 A1* | 4/2009 | Ennis ...................... A42B 3/042 348/81 |
| 2009/0109292 A1* | 4/2009 | Ennis ...................... A42B 3/042 348/158 |
| 2009/0114820 A1* | 5/2009 | Murphy ...................... G01J 3/02 250/339.01 |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0174547 A1* | 7/2009 | Greene ................... A62B 99/00 340/539.13 |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2009/0303363 A1 | 12/2009 | Blessinger |
| 2010/0020229 A1 | 1/2010 | Hershey et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0208372 A1* | 8/2010 | Heimer ...................... G01J 3/02 359/834 |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |

(56) References Cited

U.S. PATENT DOCUMENTS

| | | |
|---|---|---|
| 2011/0128384 A1 | 6/2011 | Tiscareno et al. |
| 2012/0007987 A1 | 1/2012 | Gaber |
| 2012/0083314 A1 | 4/2012 | Ng et al. |
| 2012/0169842 A1 | 7/2012 | Chuang et al. |
| 2012/0184252 A1 | 7/2012 | Hirsch |
| 2012/0200665 A1 | 8/2012 | Furumura et al. |
| 2012/0242788 A1 | 9/2012 | Chuang et al. |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0320220 A1 | 12/2013 | Donowsky |

FOREIGN PATENT DOCUMENTS

| | | |
|---|---|---|
| CN | 2899321 | 5/2007 |
| CN | 101055494 | 10/2007 |
| CN | 101262597 | 9/2008 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 0 973 137 | 1/2000 |
| EP | 1 983 485 | 10/2008 |
| EP | 2 136 554 | 12/2009 |
| EP | 2477391 | 7/2012 |
| JP | 1997275518 | 4/1999 |
| JP | 2004 004465 | 1/2004 |
| JP | 2004048571 | 2/2004 |
| JP | 2004 241491 | 8/2004 |
| JP | 2006098098 | 4/2006 |
| JP | 2006105655 | 4/2006 |
| JP | 2007006475 | 1/2007 |
| JP | 2007 267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 20060054877 | 5/2006 |
| KR | 20060071220 | 6/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |

(56) References Cited

FOREIGN PATENT DOCUMENTS

| | | |
|---|---|---|
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 00/23814 | 4/2000 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |

OTHER PUBLICATIONS

Gangkofner et al., "Optimizing the High-Pass Filter Addition Technique for Image Fusion", Photogrammetric Engineering & Remote Sensing, Sep. 2008, pp. 1107-1118, vol. 74, No. 9. In particular section titled "Short Overview of Existing Image Fusion Approaches", and "Previous Findings with Regard to HPFA Parameters". American Society for Photogrammetry and Remote Sensing, Bethesda, MD.

Ager et al., Geopositional accuracy evaluation of QuickBird ortho-ready standard 2A multispectral imagery, Algorithms and Technologies for Multispectral, Hyperspectral, and Ultraspectral Imagery X, Aug. 12, 2004, pp. 488-499, vol. 5425, Proceedings of SPIE, Bellingham WA.

\* cited by examiner

WEARABLE IMAGING DEVICES, SYSTEMS, AND METHODS

CROSS-REFERENCE TO RELATED APPLICATIONS

This application claims the benefit of U.S. Provisional Patent Application No. 61/886,543 filed Oct. 3, 2013 and entitled "WEARABLE IMAGING DEVICES, SYSTEMS, AND METHODS" which is hereby incorporated by reference in its entirety.

This application is a continuation-in-part of U.S. patent application Ser. No. 13/940,232 filed Jul. 11, 2013 and entitled "INFANT MONITORING SYSTEMS AND METHODS USING THERMAL IMAGING" which is hereby incorporated by reference in its entirety.

U.S. patent application Ser. No. 13/940,232 claims the benefit of U.S. Provisional Patent Application No. 61/670,824 filed Jul. 12, 2012 and entitled "INFANT MONITORING SYSTEMS AND METHODS USING THERMAL IMAGING" which is hereby incorporated by reference in its entirety.

This application is a continuation-in-part of U.S. patent application Ser. No. 14/137,573 filed Dec. 20, 2013 and entitled "IMAGER WITH ARRAY OF MULTIPLE INFRARED IMAGING MODULES" which is hereby incorporated by reference in its entirety.

U.S. patent application Ser. No. 14/137,573 claims the benefit of U.S. Provisional Patent Application No. 61/745,193 filed Dec. 21, 2012 and entitled "IMAGER WITH ARRAY OF MULTIPLE INFRARED IMAGING MODULES" which is hereby incorporated by reference in its entirety.

U.S. patent application Ser. No. 14/137,573 is a continuation-in-part of U.S. patent application Ser. No. 13/043,123 filed Mar. 8, 2011 and entitled "IMAGER WITH MULTIPLE SENSOR ARRAYS" which is hereby incorporated by reference in its entirety.

U.S. patent application Ser. No. 13/043,123 claims the benefit of U.S. Provisional Patent Application No. 61/312,146 filed Mar. 9, 2010 and entitled "MULTI SPECTRAL MINIATURE SENSOR" which is hereby incorporated by reference in its entirety.

This application is a continuation-in-part of U.S. patent application Ser. No. 14/101,245 filed Dec. 9, 2013 and entitled "LOW POWER AND SMALL FORM FACTOR INFRARED IMAGING" which is hereby incorporated by reference in its entirety.

U.S. patent application Ser. No. 14/101,245 is a continuation of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of U.S. patent application Ser. No. 14/099,818 filed Dec. 6, 2013 and entitled "NON-UNIFORMITY CORRECTION TECHNIQUES FOR INFRARED IMAGING DEVICES" which is hereby incorporated by reference in its entirety.

U.S. patent application Ser. No. 14/099,818 is a continuation of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

U.S. patent application Ser. No. 14/101,258 is a continuation of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of U.S. patent application Ser. No. 13/437,645 filed Apr. 2, 2012 and entitled "INFRARED RESOLUTION AND CONTRAST ENHANCEMENT WITH FUSION" which is hereby incorporated by reference in its entirety.

U.S. patent application Ser. No. 13/437,645 is a continuation-in-part of U.S. patent application Ser. No. 13/105,765 filed May 11, 2011 and entitled "INFRARED RESOLUTION AND CONTRAST ENHANCEMENT WITH FUSION" which is hereby incorporated by reference in its entirety.

U.S. patent application Ser. No. 13/437,645 also claims the benefit of U.S. Provisional Patent Application No. 61/473,207 filed Apr. 8, 2011 and entitled "INFRARED RESOLUTION AND CONTRAST ENHANCEMENT WITH FUSION" which is hereby incorporated by reference in its entirety.

U.S. patent application Ser. No. 13/437,645 is also a continuation-in-part of U.S. patent application Ser. No. 12/766,739 filed Apr. 23, 2010 and entitled "INFRARED RESOLUTION AND CONTRAST ENHANCEMENT WITH FUSION" which is hereby incorporated by reference in its entirety.

U.S. patent application Ser. No. 13/105,765 is a continuation of International Patent Application No. PCT/EP2011/056432 filed Apr. 21, 2011 and entitled "INFRARED RESOLUTION AND CONTRAST ENHANCEMENT WITH FUSION" which is hereby incorporated by reference in its entirety.

U.S. patent application Ser. No. 13/105,765 is also a continuation-in-part of U.S. patent application Ser. No. 12/766,739 which is hereby incorporated by reference in its entirety.

International Patent Application No. PCT/EP2011/056432 is a continuation-in-part of U.S. patent application Ser. No. 12/766,739 which is hereby incorporated by reference in its entirety.

International Patent Application No. PCT/EP2011/056432 also claims the benefit of U.S. Provisional Patent Application No. 61/473,207 which is hereby incorporated by reference in its entirety.

This application is a continuation-in-part of U.S. patent application Ser. No. 14/138,058 filed Dec. 21, 2013 and entitled "COMPACT MULTI-SPECTRUM IMAGING WITH FUSION" which is hereby incorporated by reference in its entirety.

U.S. patent application Ser. No. 14/138,058 claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

This application is a continuation-in-part of U.S. patent application Ser. No. 14/299,987 filed Jun. 9, 2014 and entitled "INFRARED CAMERA SYSTEMS AND METHODS FOR DUAL SENSOR APPLICATIONS" which is hereby incorporated by reference in its entirety.

U.S. patent application Ser. No. 14/299,987 is a continuation of U.S. patent application Ser. No. 12/477,828 filed Jun. 3, 2009 and entitled "INFRARED CAMERA SYSTEMS AND METHODS FOR DUAL SENSOR APPLICATIONS" which is hereby incorporated by reference in its entirety.

This application is a continuation-in-part of U.S. patent application Ser. No. 14/138,040 filed Dec. 21, 2013 and entitled "TIME SPACED INFRARED IMAGE ENHANCEMENT" which is hereby incorporated by reference in its entirety.

U.S. patent application Ser. No. 14/138,040 claims the benefit of U.S. Provisional Patent Application No. 61/792,582 filed Mar. 15, 2013 and entitled "TIME SPACED INFRARED IMAGE ENHANCEMENT" which is hereby incorporated by reference in its entirety.

U.S. patent application Ser. No. 14/138,040 also claims the benefit of U.S. Provisional Patent Application No. 61/746,069 filed Dec. 26, 2012 and entitled "TIME SPACED INFRARED IMAGE ENHANCEMENT" which is hereby incorporated by reference in its entirety.

This application is a continuation-in-part of U.S. patent application Ser. No. 14/138,052 filed Dec. 21, 2013 and entitled "INFRARED IMAGING ENHANCEMENT WITH FUSION" which is hereby incorporated by reference in its entirety.

U.S. patent application Ser. No. 14/138,052 claims the benefit of U.S. Provisional Patent Application No. 61/793,952 filed Mar. 15, 2013 and entitled "INFRARED IMAGING ENHANCEMENT WITH FUSION" which is hereby incorporated by reference in its entirety.

U.S. patent application Ser. No. 14/138,052 also claims the benefit of U.S. Provisional Patent Application No. 61/746,074 filed Dec. 26, 2012 and entitled "INFRARED IMAGING ENHANCEMENT WITH FUSION" which is hereby incorporated by reference in its entirety.

TECHNICAL FIELD

One or more embodiments of the invention relate generally to thermal imaging devices and more particularly, for example, to wearable thermal imaging devices.

BACKGROUND

Thermal imaging systems are often used to detect objects in various situations. As examples, law enforcement personnel, defense personnel, security systems, and game hunters sometimes use thermal imaging systems to detect the presence of humans or animals in the surrounding environment of the system.

However, in conventional systems, a user of a thermal imaging system often must already know the location of the object to be detected, the object to be detected must move in front of a fixed imaging system, or the system must be scanned over an area in order to locate the object. Moreover, these systems are typically either fixed systems that monitor a constant location or handheld systems that require the hands of a user to hold and operate the system.

Fixed systems can be limited in their ability to detect the presence of objects around a mobile user. Handheld systems can be impractical in situations in which the operator of the system needs free hands for other activities and/or needs constant monitoring of a wide range of angles around the user.

It would therefore be desirable to provide improved thermal imaging systems.

SUMMARY

Various embodiments are disclosed for wearable imaging systems. A wearable imaging system may be a wearable thermal imaging system and/or a wearable imaging device such as a wearable multisensor array having multiple infrared imaging modules, each with a field of view that includes a portion of a scene. The infrared imaging modules may be mounted on a wearable structure such as a helmet structure. The wearable structure may be formed from rigid materials that protect the wearer from impacts. The wearable structure may be partially or completely covered with a patterned material such as a painted pattern or a patterned fabric.

The wearable imaging device may include a housing structure that wraps around a portion of the wearable structure. The housing structure may be a detachable structure that can be removed from the wearable structure or can be integrally formed with the housing structure.

The wearable imaging device may include one or more alert components. Each alert component may be associated with one or more of the infrared imaging modules. For example, each infrared imaging module may include an alert component mounted on the wearable structure next to that infrared imaging module. Alert components may be haptic components such as piezoelectric components, audio components such as speakers, light-emitting components such as light emitting diodes or a display, heat-generating components such as a heating element, or other suitable components for generating alerts for the wearer.

Thermal images captured using the infrared imaging modules may be processed to detect objects such as a human or an animal. The multisensor array may include a processor that processes the thermal images and detects the objects. When an object is detected, the processor may operate one of the alert components to alert the wearer that an object has been detected. The processor may operate alert components located near the infrared imaging module that captured the image of the object. In this way, the alert component can be used to alert the wearer to both the presence of the object and the location of the object.

In one embodiment, the wearable imaging device may be implemented as a multidirectional threat monitoring helmet that may be worn by military personnel, law enforcement personnel, hunters or others who desire to be alerted to the presence and location of a living being in their vicinity. For example, a soldier on patrol at night may wish to be alerted to the presence and location of an enemy combatant approaching from a particular direction. A multidirectional threat monitoring helmet may be used to thermally detect the enemy combatant using one or more infrared imaging modules on the helmet and to alert the wearer of the helmet to the presence and location of the enemy combatant.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
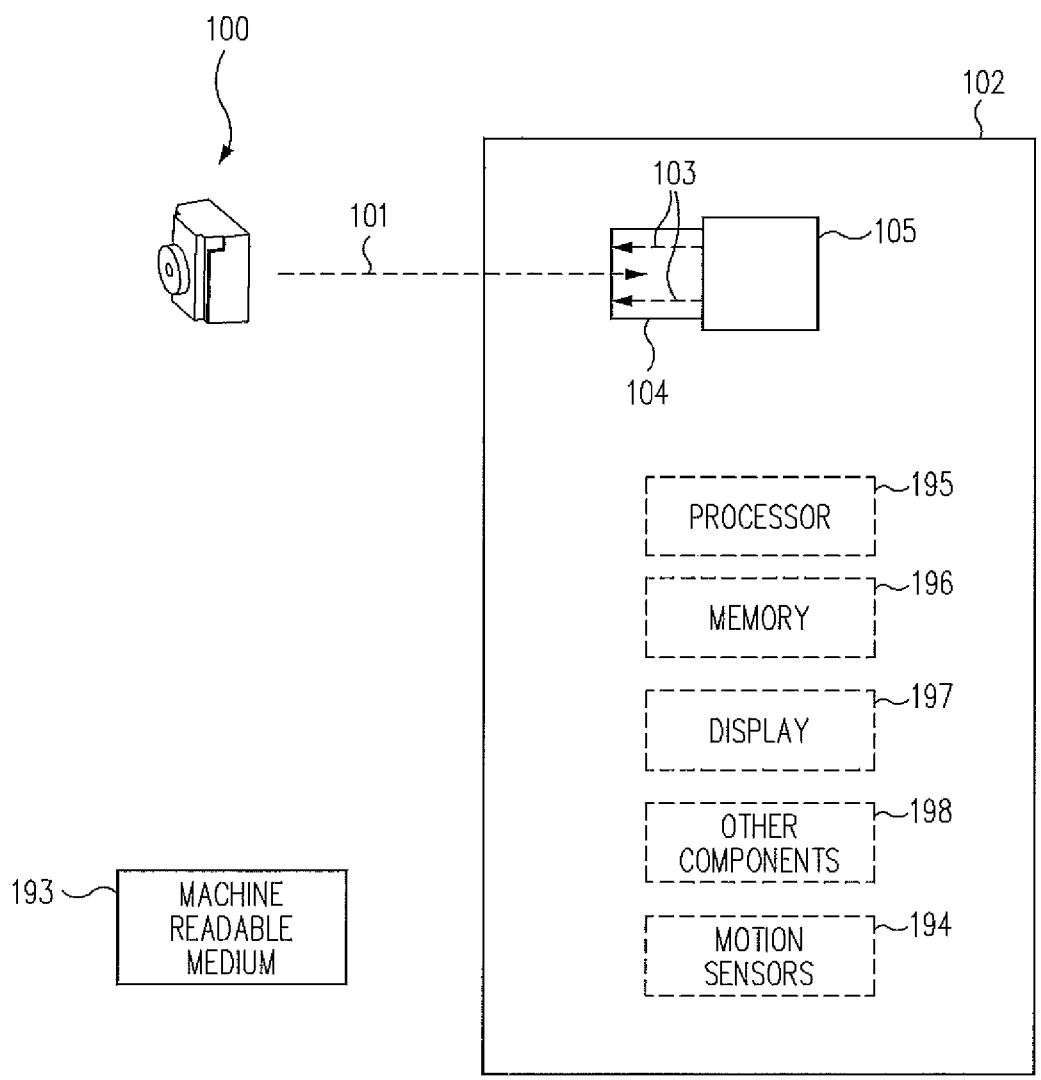
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, a wearable imaging device, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
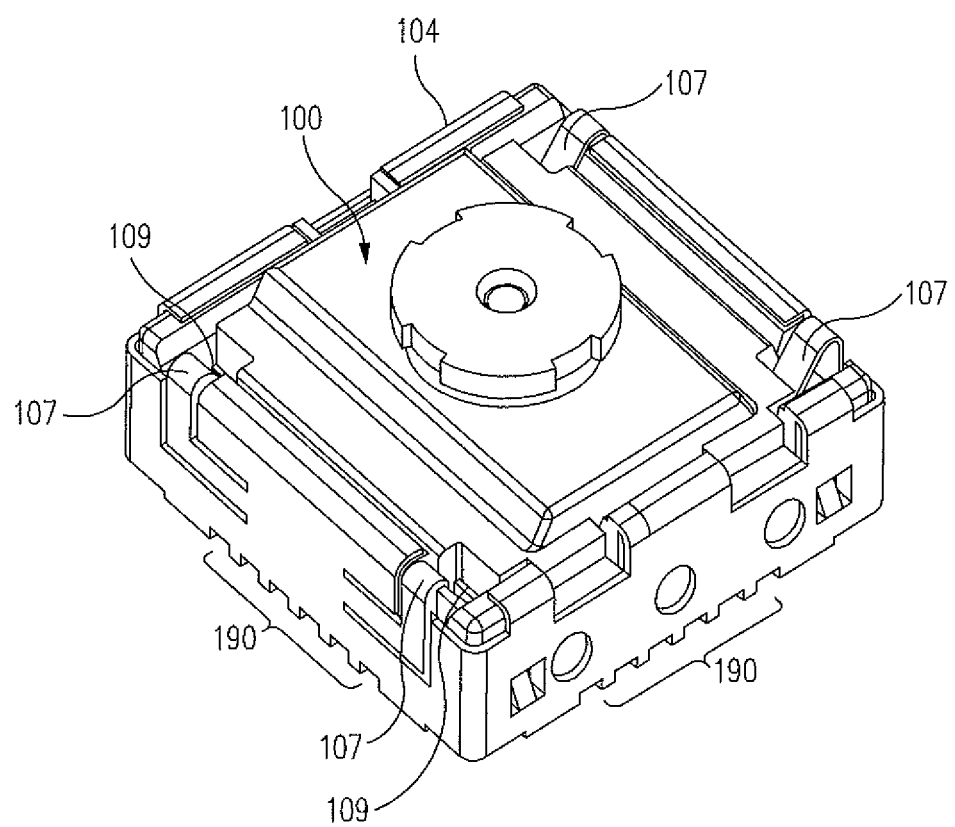
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
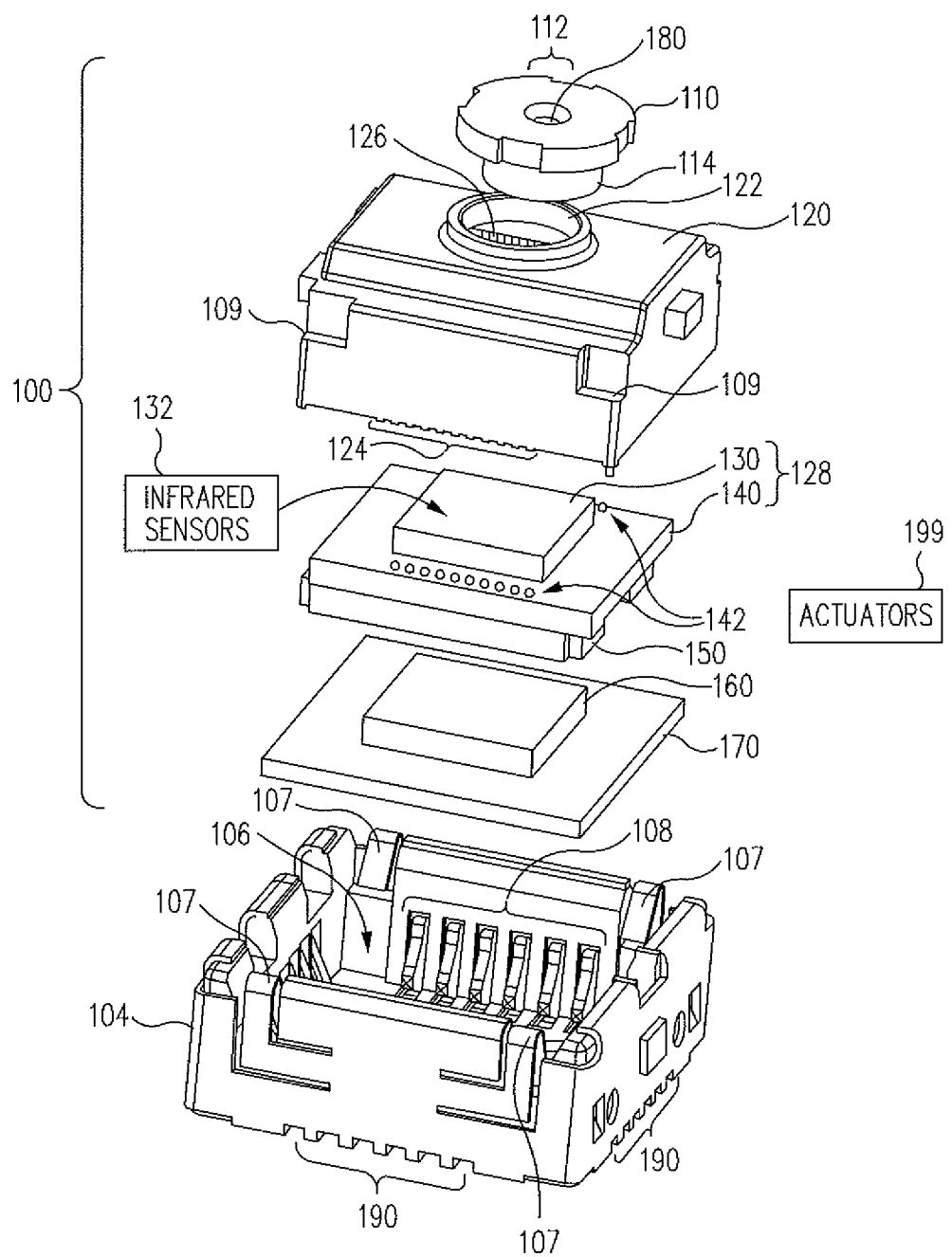
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
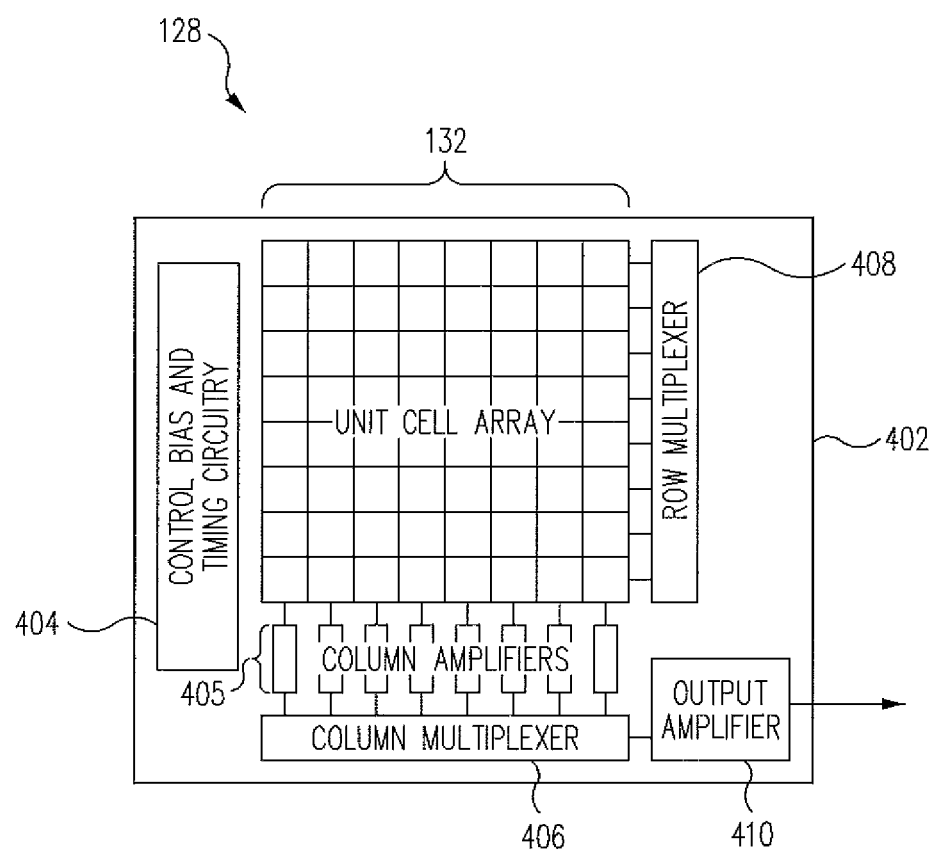
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROW at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
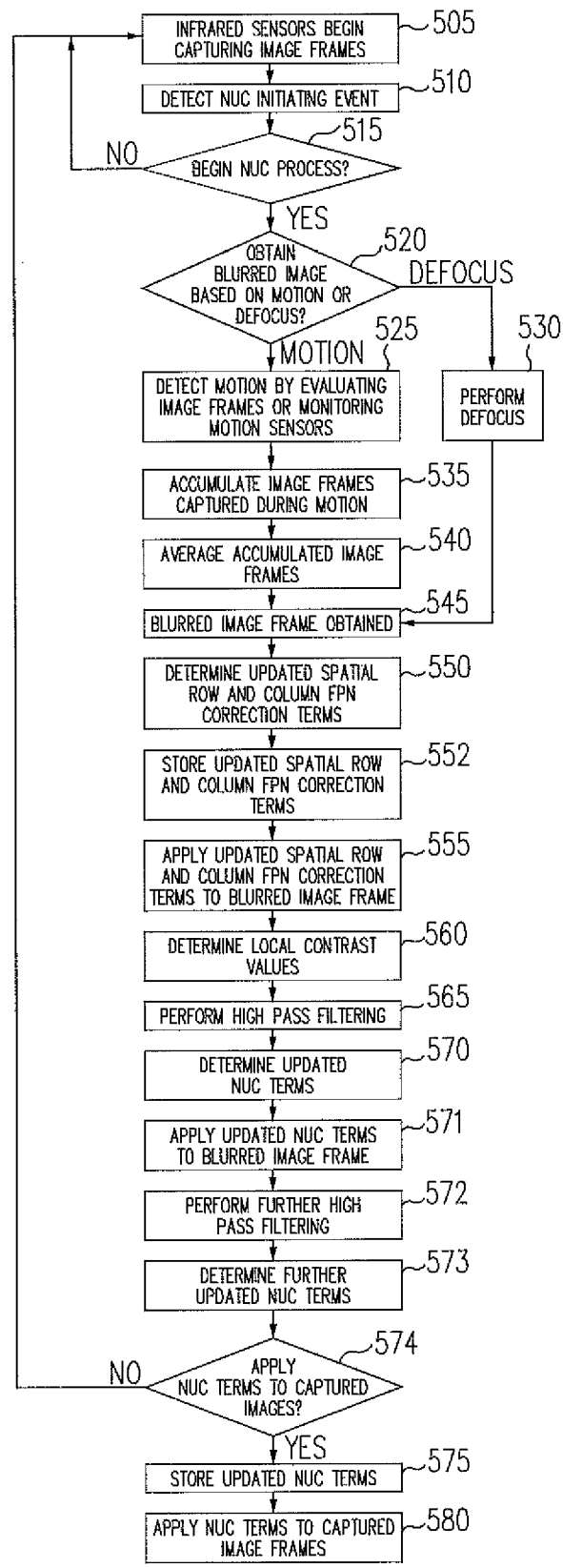
FIG. 5 illustrates a flow diagram of various operations to determine NUC terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is exceeded (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
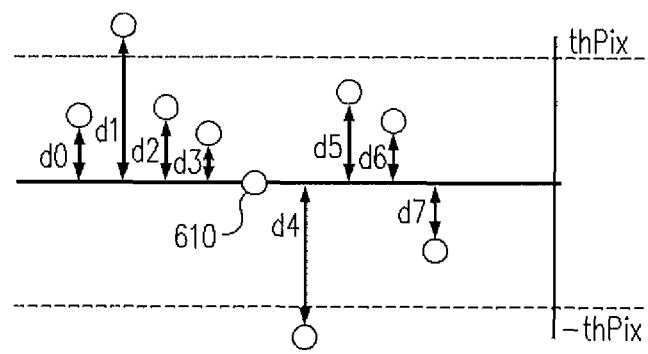
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
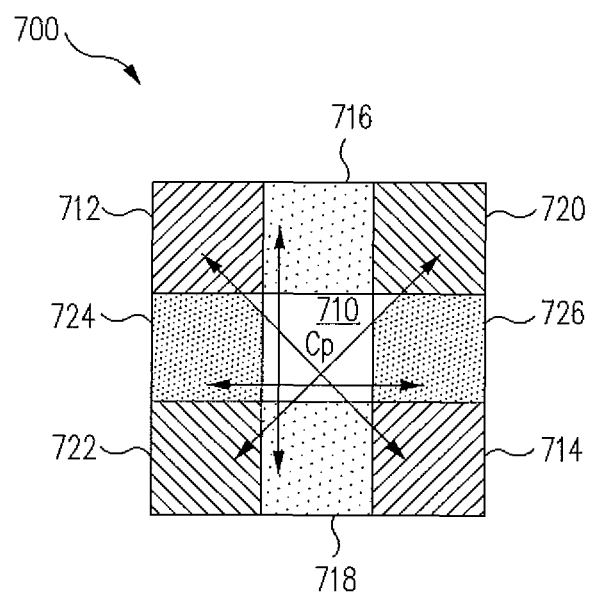
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC teens can be further reduced by applying some amount of temporal damping to the NUC term determination process. For example, a temporal damping factor $\lambda$ between 0 and 1 may be chosen such that the new NUC($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
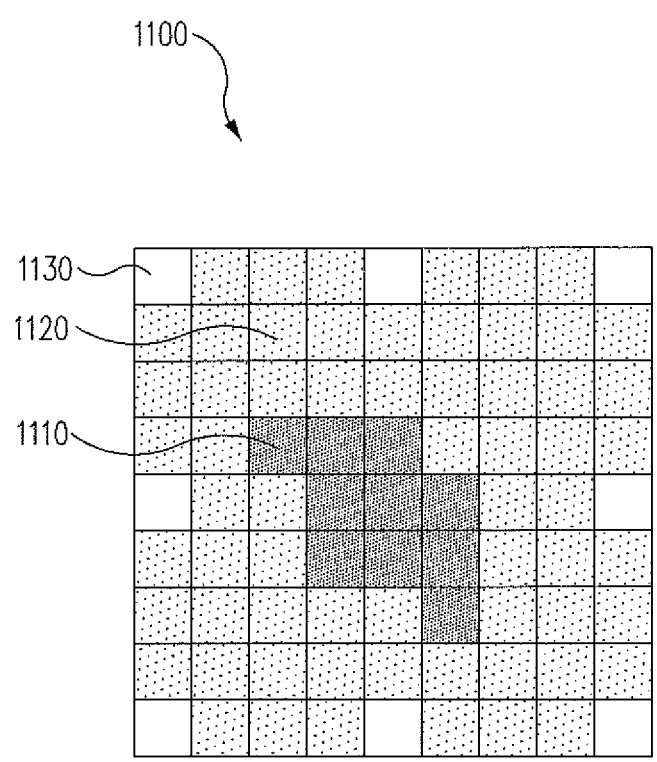
FIG. 11 illustrates spatially correlated FPN in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
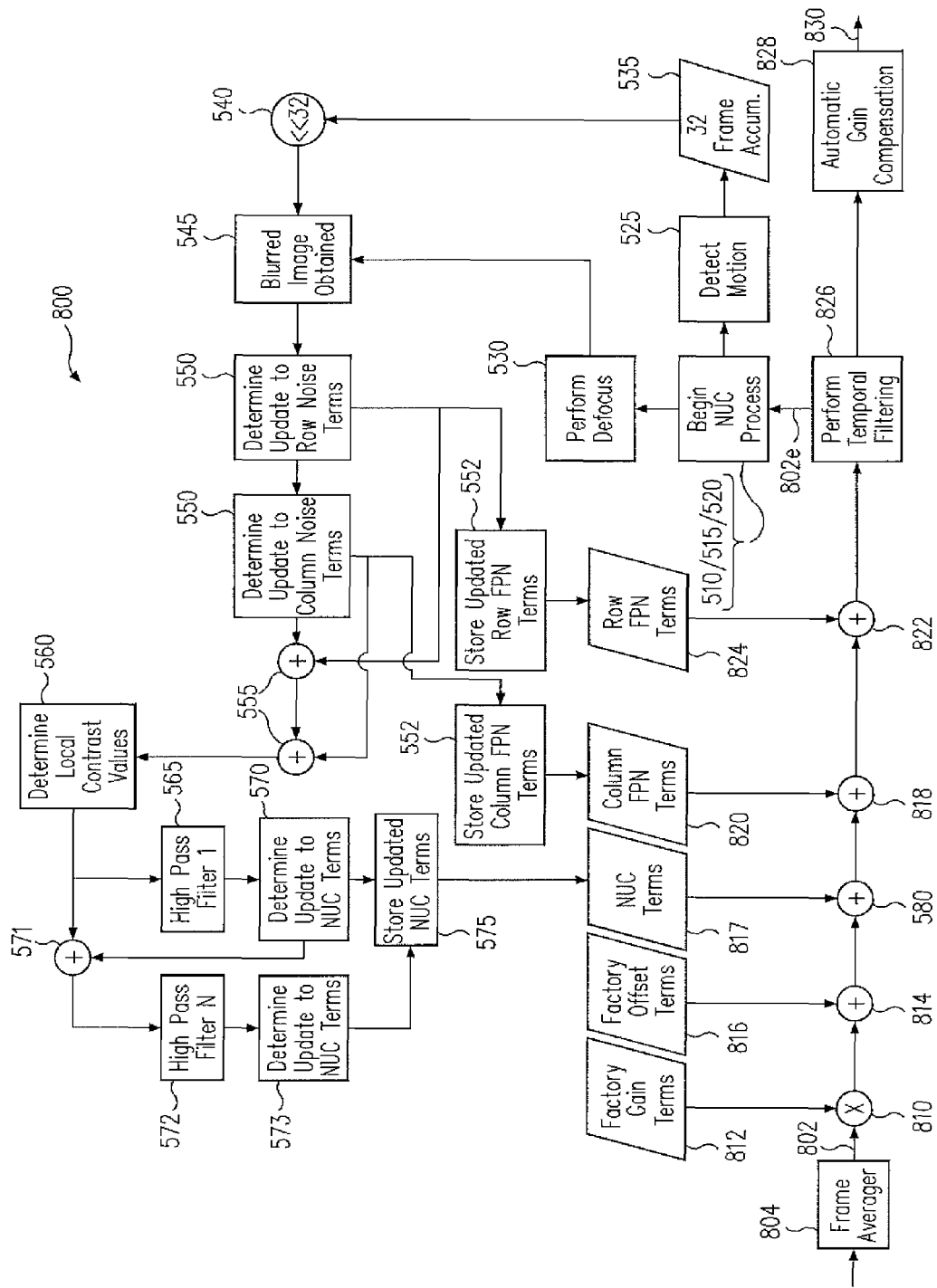
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
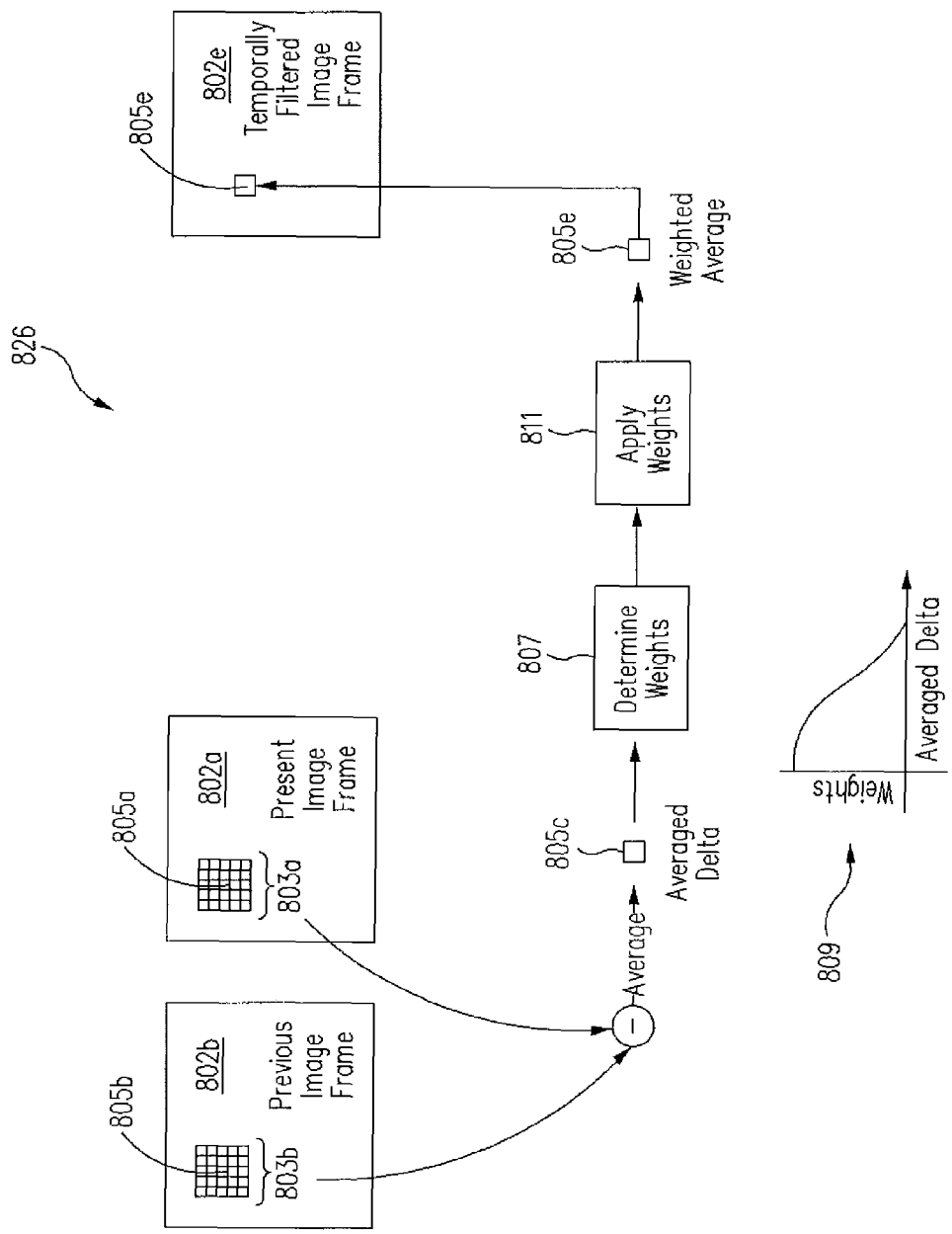
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
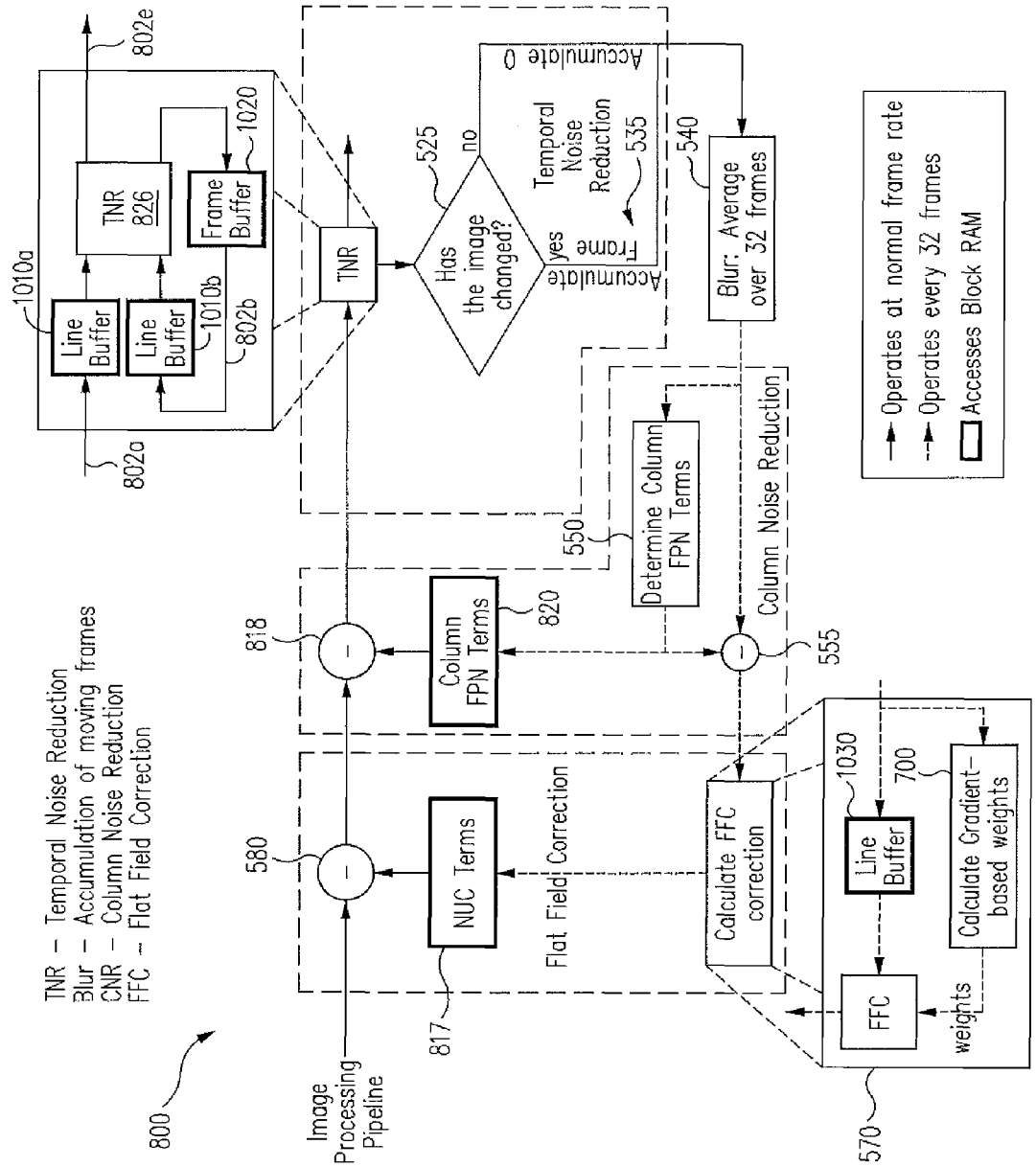
FIG. 10 illustrates particular implementation details of several processes of the image processing pipeline of FIG. 6 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is 1/32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction ter is determined in accordance with the various described techniques.

As discussed, in various embodiments, infrared imaging module 100 may be configured to operate at low voltage levels. In particular, infrared imaging module 100 may be implemented with circuitry configured to operate at low power and/or in accordance with other parameters that permit infrared imaging module 100 to be conveniently and effectively implemented in various types of host devices 102, such as mobile devices and other devices.

Figure 12:
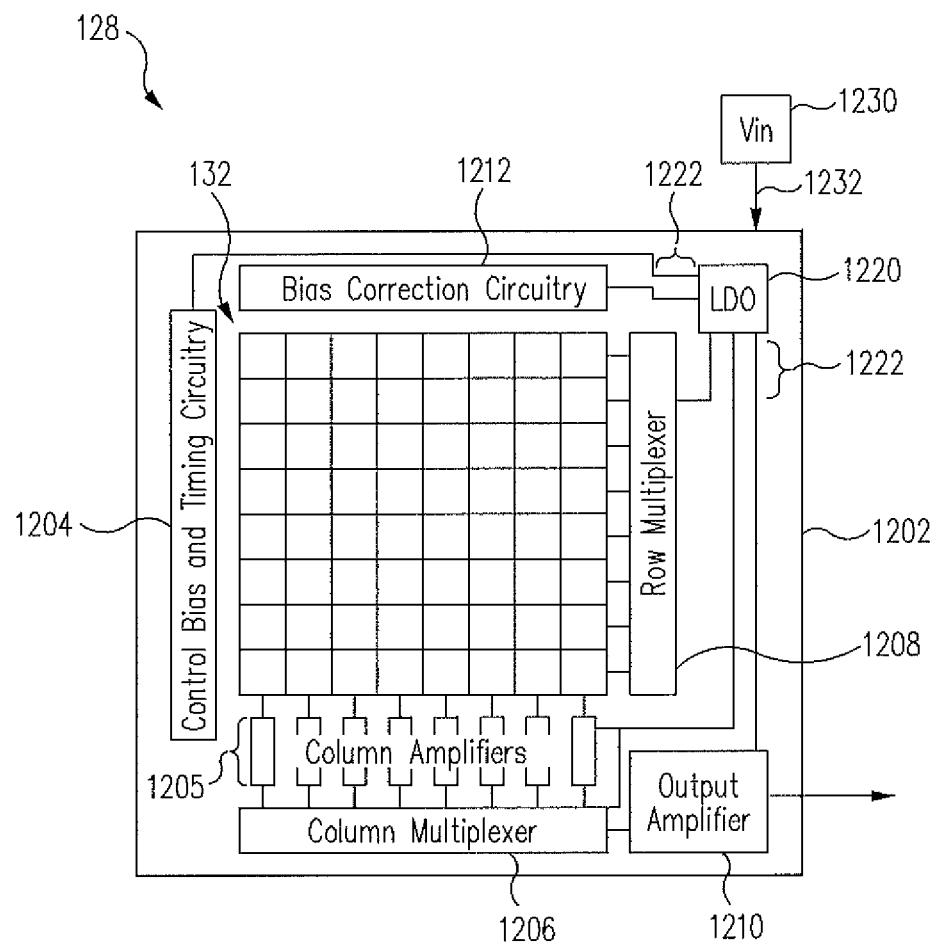
FIG. 12 illustrates a block diagram of another implementation of an infrared sensor assembly including an array of infrared sensors and a low-dropout regulator in accordance with an embodiment of the disclosure.

For example, FIG. 12 illustrates a block diagram of another implementation of infrared sensor assembly 128 including infrared sensors 132 and an LDO 1220 in accordance with an embodiment of the disclosure. As shown, FIG. 12 also illustrates various components 1202, 1204, 1205, 1206, 1208, and 1210 which may implemented in the same or similar manner as corresponding components previously described with regard to FIG. 4. FIG. 12 also illustrates bias correction circuitry 1212 which may be used to adjust one or more bias voltages provided to infrared sensors 132 (e.g., to compensate for temperature changes, self-heating, and/or other factors).

In some embodiments, LDO 1220 may be provided as part of infrared sensor assembly 128 (e.g., on the same chip and/or wafer level package as the ROIC). For example, LDO 1220 may be provided as part of an FPA with infrared sensor assembly 128. As discussed, such implementations may reduce power supply noise introduced to infrared sensor assembly 128 and thus provide an improved PSRR. In addition, by implementing the LDO with the ROIC, less die area may be consumed and fewer discrete die (or chips) are needed.

LDO 1220 receives an input voltage provided by a power source 1230 over a supply line 1232. LDO 1220 provides an output voltage to various components of infrared sensor assembly 128 over supply lines 1222. In this regard, LDO 1220 may provide substantially identical regulated output voltages to various components of infrared sensor assembly 128 in response to a single input voltage received from power source 1230.

For example, in some embodiments, power source 1230 may provide an input voltage in a range of approximately 2.8 volts to approximately 11 volts (e.g., approximately 2.8 volts in one embodiment), and LDO 1220 may provide an output voltage in a range of approximately 1.5 volts to approximately 2.8 volts (e.g., approximately 2.5 volts in one embodiment). In this regard, LDO 1220 may be used to provide a consistent regulated output voltage, regardless of whether power source 1230 is implemented with a conventional voltage range of approximately 9 volts to approximately 11 volts, or a low voltage such as approximately 2.8 volts. As such, although various voltage ranges are provided for the input and output voltages, it is contemplated that the output voltage of LDO 1220 will remain fixed despite changes in the input voltage.

The implementation of LDO 1220 as part of infrared sensor assembly 128 provides various advantages over conventional power implementations for FPAs. For example, conventional FPAs typically rely on multiple power sources, each of which may be provided separately to the FPA, and separately distributed to the various components of the FPA. By regulating a single power source 1230 by LDO 1220, appropriate voltages may be separately provided (e.g., to reduce possible noise) to all components of infrared sensor assembly 128 with reduced complexity. The use of LDO 1220 also allows infrared sensor assembly 128 to operate in a consistent manner, even if the input voltage from power source 1230 changes (e.g., if the input voltage increases or decreases as a result of charging or discharging a battery or other type of device used for power source 1230).

The various components of infrared sensor assembly 128 shown in FIG. 12 may also be implemented to operate at lower voltages than conventional devices. For example, as discussed, LDO 1220 may be implemented to provide a low voltage (e.g., approximately 2.5 volts). This contrasts with the multiple higher voltages typically used to power conventional FPAs, such as: approximately 3.3 volts to approximately 5 volts used to power digital circuitry; approximately 3.3 volts used to power analog circuitry; and approximately 9 volts to approximately 11 volts used to power loads. Also, in some embodiments, the use of LDO 1220 may reduce or eliminate the need for a separate negative reference voltage to be provided to infrared sensor assembly 128.

Figure 13:
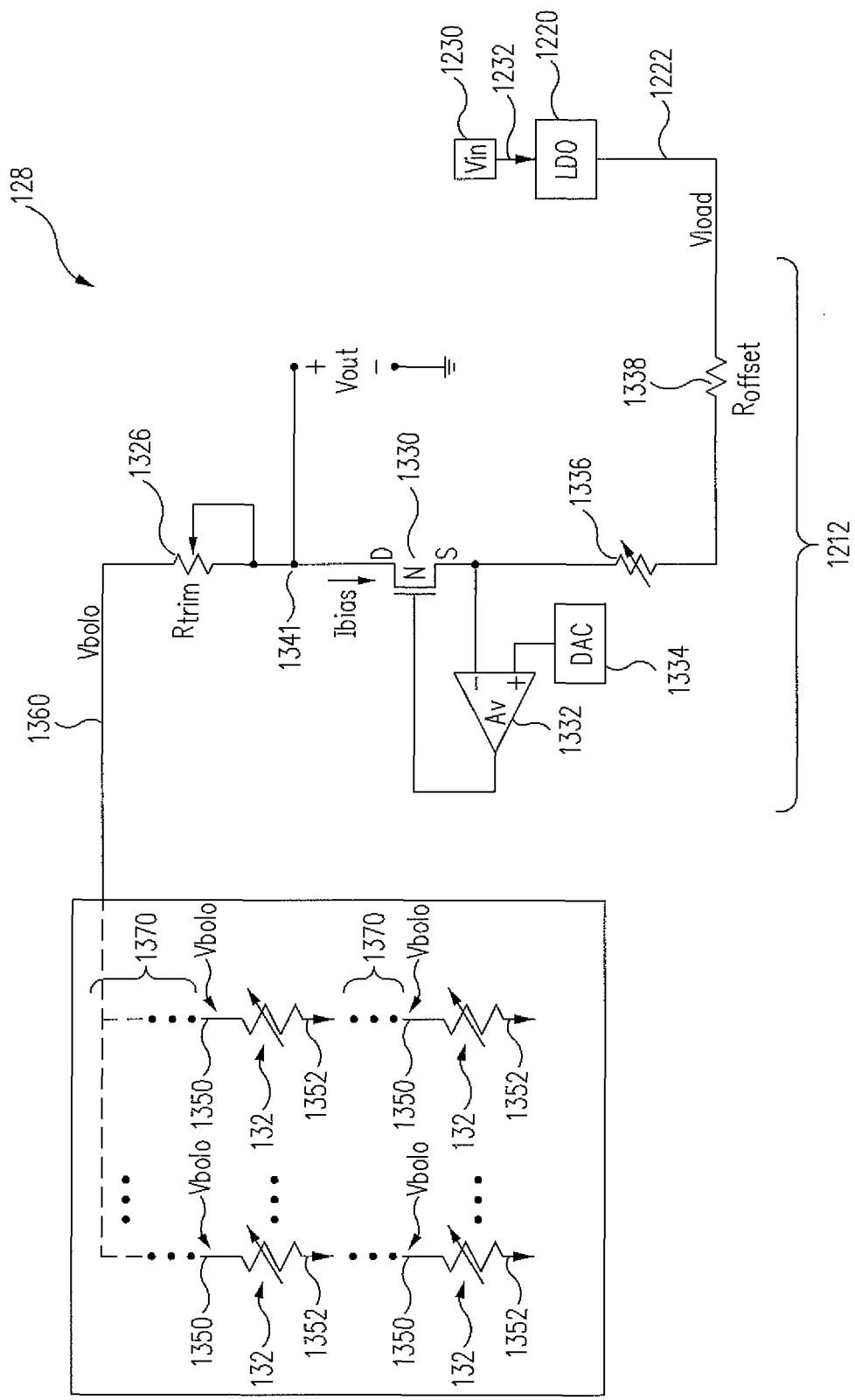
FIG. 13 illustrates a circuit diagram of a portion of the infrared sensor assembly of FIG. 12 in accordance with an embodiment of the disclosure.

Additional aspects of the low voltage operation of infrared sensor assembly 128 may be further understood with reference to FIG. 13. FIG. 13 illustrates a circuit diagram of a portion of infrared sensor assembly 128 of FIG. 12 in accordance with an embodiment of the disclosure. In particular, FIG. 13 illustrates additional components of bias correction circuitry 1212 (e.g., components 1326, 1330, 1332, 1334, 1336, 1338, and 1341) connected to LDO 1220 and infrared sensors 132. For example, bias correction circuitry 1212 may be used to compensate for temperature-dependent changes in bias voltages in accordance with an embodiment of the present disclosure. The operation of such additional components may be further understood with reference to similar components identified in U.S. Pat. No. 7,679,048 issued Mar. 16, 2010 which is hereby incorporated by reference in its entirety. Infrared sensor assembly 128 may also be implemented in accordance with the various components identified in U.S. Pat. No. 6,812,465 issued Nov. 2, 2004 which is hereby incorporated by reference in its entirety.

In various embodiments, some or all of the bias correction circuitry 1212 may be implemented on a global array basis as shown in FIG. 13 (e.g., used for all infrared sensors 132 collectively in an array). In other embodiments, some or all of the bias correction circuitry 1212 may be implemented an individual sensor basis (e.g., entirely or partially duplicated for each infrared sensor 132). In some embodiments, bias correction circuitry 1212 and other components of FIG. 13 may be implemented as part of ROIC 1202.

As shown in FIG. 13, LDO 1220 provides a load voltage Vload to bias correction circuitry 1212 along one of supply lines 1222. As discussed, in some embodiments, Vload may be approximately 2.5 volts which contrasts with larger voltages of approximately 9 volts to approximately 11 volts that may be used as load voltages in conventional infrared imaging devices.

Based on Vload, bias correction circuitry 1212 provides a sensor bias voltage Vbolo at a node 1360. Vbolo may be distributed to one or more infrared sensors 132 through appropriate switching circuitry 1370 (e.g., represented by broken lines in FIG. 13). In some examples, switching circuitry 1370 may be implemented in accordance with appropriate components identified in U.S. Pat. Nos. 6,812,465 and 7,679,048 previously referenced herein.

Each infrared sensor 132 includes a node 1350 which receives Vbolo through switching circuitry 1370, and another node 1352 which may be connected to ground, a substrate, and/or a negative reference voltage. In some embodiments, the voltage at node 1360 may be substantially the same as Vbolo provided at nodes 1350. In other embodiments, the voltage at node 1360 may be adjusted to compensate for possible voltage drops associated with switching circuitry 1370 and/or other factors.

Vbolo may be implemented with lower voltages than are typically used for conventional infrared sensor biasing. In one embodiment, Vbolo may be in a range of approximately 0.2 volts to approximately 0.7 volts. In another embodiment, Vbolo may be in a range of approximately 0.4 volts to approximately 0.6 volts. In another embodiment, Vbolo may be approximately 0.5 volts. In contrast, conventional infrared sensors typically use bias voltages of approximately 1 volt.

The use of a lower bias voltage for infrared sensors 132 in accordance with the present disclosure permits infrared sensor assembly 128 to exhibit significantly reduced power consumption in comparison with conventional infrared imaging devices. In particular, the power consumption of each infrared sensor 132 is reduced by the square of the bias voltage. As a result, a reduction from, for example, 1.0 volt to 0.5 volts provides a significant reduction in power, especially when applied to many infrared sensors 132 in an infrared sensor array. This reduction in power may also result in reduced self-heating of infrared sensor assembly 128.

In accordance with additional embodiments of the present disclosure, various techniques are provided for reducing the effects of noise in image frames provided by infrared imaging devices operating at low voltages. In this regard, when infrared sensor assembly 128 is operated with low voltages as described, noise, self-heating, and/or other phenomena may, if uncorrected, become more pronounced in image frames provided by infrared sensor assembly 128.

For example, referring to FIG. 13, when LDO 1220 maintains Vload at a low voltage in the manlier described herein, Vbolo will also be maintained at its corresponding low voltage and the relative size of its output signals may be reduced. As a result, noise, self-heating, and/or other phenomena may have a greater effect on the smaller output signals read out from infrared sensors 132, resulting in variations (e.g., errors) in the output signals. If uncorrected, these variations may be exhibited as noise in the image frames. Moreover, although low voltage operation may reduce the overall amount of certain phenomena (e.g., self-heating), the smaller output signals may permit the remaining error sources (e.g., residual self-heating) to have a disproportionate effect on the output signals during low voltage operation.

To compensate for such phenomena, infrared sensor assembly 128, infrared imaging module 100, and/or host device 102 may be implemented with various array sizes, frame rates, and/or frame averaging techniques. For example, as discussed, a variety of different array sizes are contemplated for infrared sensors 132. In some embodiments, infrared sensors 132 may be implemented with array sizes ranging from 32 by 32 to 160 by 120 infrared sensors 132. Other example array sizes include 80 by 64, 80 by 60, 64 by 64, and 64 by 32. Any desired array size may be used.

Advantageously, when implemented with such relatively small array sizes, infrared sensor assembly 128 may provide image frames at relatively high frame rates without requiring significant changes to ROIC and related circuitry. For example, in some embodiments, frame rates may range from approximately 120 Hz to approximately 480 Hz.

In some embodiments, the array size and the frame rate may be scaled relative to each other (e.g., in an inversely proportional manner or otherwise) such that larger arrays are implemented with lower frame rates, and smaller arrays are implemented with higher frame rates. For example, in one embodiment, an array of 160 by 120 may provide a frame rate of approximately 120 Hz. In another embodiment, an array of 80 by 60 may provide a correspondingly higher frame rate of approximately 240 Hz. Other frame rates are also contemplated.

By scaling the array size and the frame rate relative to each other, the particular readout timing of rows and/or columns of the FPA may remain consistent, regardless of the actual FPA size or frame rate. In one embodiment, the readout timing may be approximately 63 microseconds per row or column.

As previously discussed with regard to FIG. 8, the image frames captured by infrared sensors 132 may be provided to a frame averager 804 that integrates multiple image frames to provide image frames 802 (e.g., processed image frames) with a lower frame rate (e.g., approximately 30 Hz, approximately 60 Hz, or other frame rates) and with an improved signal to noise ratio. In particular, by averaging the high frame rate image frames provided by a relatively small FPA, image noise attributable to low voltage operation may be effectively averaged out and/or substantially reduced in image frames 802. Accordingly, infrared sensor assembly 128 may be operated at relatively low voltages provided by LDO 1220 as discussed without experiencing additional noise and related side effects in the resulting image frames 802 after processing by frame averager 804.

Other embodiments are also contemplated. For example, although a single array of infrared sensors 132 is illustrated, it is contemplated that multiple such arrays may be used together to provide higher resolution image frames (e.g., a scene may be imaged across multiple such arrays). Such arrays may be provided in multiple infrared sensor assemblies 128 and/or provided in the same infrared sensor assembly 128. Each such array may be operated at low voltages as described, and also may be provided with associated ROIC circuitry such that each array may still be operated at a relatively high frame rate. The high frame rate image frames provided by such arrays may be averaged by shared or dedicated frame averagers 804 to reduce and/or eliminate noise associated with low voltage operation. As a result, high resolution infrared images may be obtained while still operating at low voltages.

In various embodiments, infrared sensor assembly 128 may be implemented with appropriate dimensions to permit infrared imaging module 100 to be used with a small form factor socket 104, such as a socket used for mobile devices. For example, in some embodiments, infrared sensor assembly 128 may be implemented with a chip size in a range of approximately 4.0 mm by approximately 4.0 mm to approximately 5.5 mm by approximately 5.5 mm (e.g., approximately 4.0 mm by approximately 5.5 mm in one example). Infrared sensor assembly 128 may be implemented with such sizes or other appropriate sizes to permit use with socket 104 implemented with various sizes such as: 8.5 mm by 8.5 mm, 8.5 mm by 5.9 mm, 6.0 mm by 6.0 mm, 5.5 mm by 5.5 mm, 4.5 mm by 4.5 mm, and/or other socket sizes such as, for example, those identified in Table 1 of U.S. Provisional Patent Application No. 61/495,873 previously referenced herein.

Figure 14:
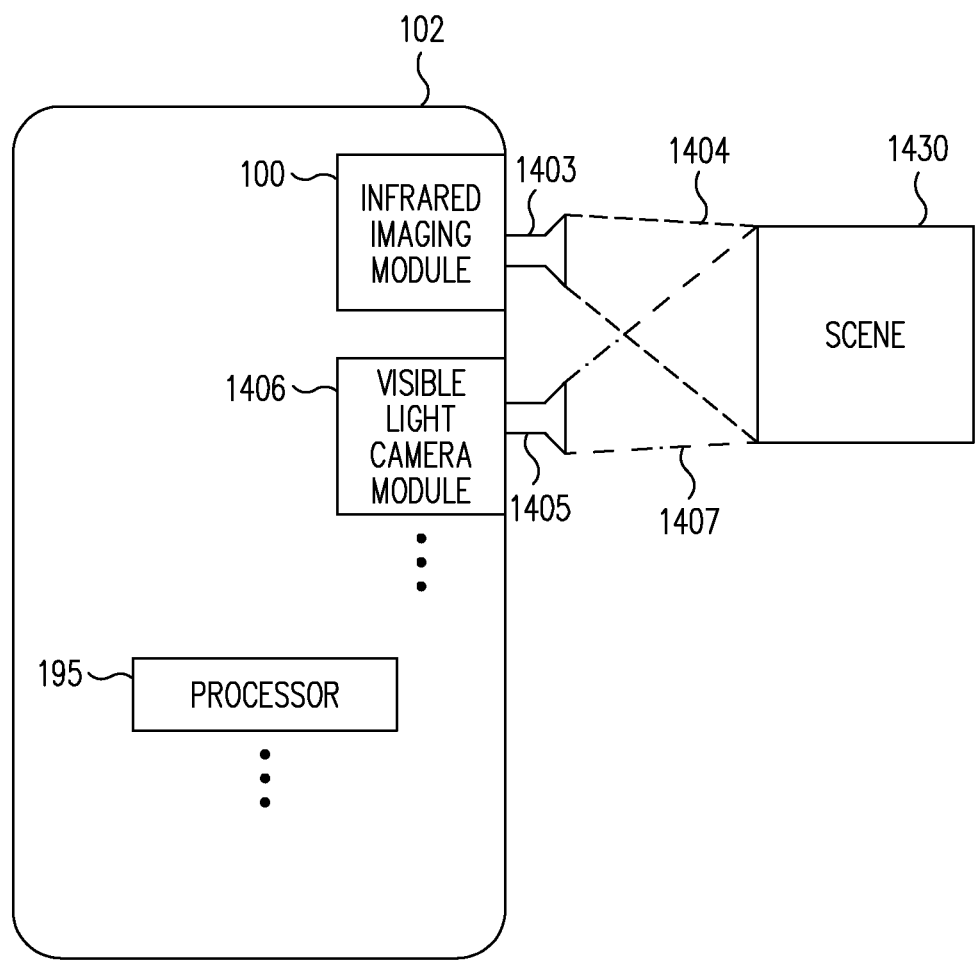
FIG. 14 illustrates a block diagram of a host system having an infrared imaging module and a visible light camera in accordance with an embodiment of the disclosure.

Referring now to FIG. 14, a block diagram is shown of another implementation of host system 102 showing how system 102 may include one or more non-thermal imaging modules such as visible light camera module 1406 in addition to one or more infrared imaging modules such as infrared imaging module 100 in accordance with an embodiment of the disclosure. System 102 may be used to monitor a real-world scene such as scene 1430.

System 102 may include one or more infrared imaging modules 100, one or more visible light cameras 1406, and additional components as described above in connection with FIG. 1 (e.g., processor 195, memory 196, display 197, one or more motion sensors 194, and/or other components 198 such as a control panel, alert components, or communications components). In various embodiments, components of system 102 of FIG. 14 may be implemented in the same or similar manner as corresponding components of host device 102 of FIG. 1. Moreover, components of system 102 may be configured to perform various NUC processes and other processes described herein.

As shown in FIG. 14, in some embodiments, infrared imaging module 100 may include various optical elements 1403 (e.g., one or more infrared-transmissive lens, one or more infrared-transmissive prisms, one or more infrared-reflective mirrors, or one or more infrared fiber optic elements) that guide infrared radiation from scene 1430 to an FPA of infrared imaging module 100. In some embodiments, optical elements 1403 may be used to suitably define or alter FOV 1404 of infrared imaging module 100. A switchable FOV (e.g., selectable by infrared imaging module 100 and/or processor 195) may optionally be provided, which may be useful when, for example, a selective close-up view of a portion of scene 1430 is desired.

Optical elements 1403 may also include one or more filters adapted to pass infrared radiation of some wavelengths but substantially block infrared radiation of other wavelengths (e.g., short-wave infrared (SWIR) filters, mid-wave infrared (MWIR) filters, long-wave infrared (LWIR) filters, and narrow-band filters). Such filters may be utilized to tailor infrared imaging module 100 for increased sensitivity to a desired band of infrared wavelengths. For example, in some situations, it may be desirable to detect exhaled breaths of a person or an animal. In this type of situation, a better result may be achieved by utilizing a narrow-band filter that transmits only in the wavelengths matching a specific absorption/emission spectrum of carbon dioxide ($CO_2$) or other constituent gases of an exhaled breath. In some embodiments, filters may be selectable (e.g., provided as a selectable filter wheel). In other embodiments, filters may be fixed as appropriate for a desired application of system 102.

Visible light camera 1406 may be a small form factor non-thermal imaging module or imaging device, and may be implemented in a similar manner as various embodiments of infrared imaging module 100 disclosed herein, but with one or more sensors responsive to non-thermal radiation (e.g., radiation in the visible, near infrared, short-wave infrared or other non-thermal portion of the electromagnetic spectrum). For example, in some embodiments, visible light camera 1406 may be implemented with a charge-coupled device (CCD) sensor, an electron multiplying CCD (EMCCD) sensor, a complementary metal-oxide-semiconductor (CMOS) sensor, a scientific CMOS (sCMOS) sensor, an intensified charge-coupled device (ICCD), or other sensors.

As shown in FIG. 14, in some embodiments, visible light camera module 1406 may include various optical elements 1405 (e.g., one or more lenses, one or more color filters, one or more prisms, one or more mirrors, or one or more fiber optic elements) that guide non-thermal radiation from scene 1430 to visible light camera module 1406. In some embodiments, optical elements 1405 may be used to suitably define or alter FOV 1407 of visible light camera module 1406. A switchable FOV (e.g., selectable by visible light camera module 1406 and/or processor 195) may optionally be provided, which may be useful when, for example, a selective close-up view of a portion of scene 1430 is desired. If desired, elements 1403 and 1405 may be operable to alternately switch between an infrared imaging mode and a visible light imaging mode for system 102.

Optical elements 1405 may also include one or more filters adapted to pass radiation of some wavelengths (colors) but substantially block radiation of other wavelengths (e.g., red color filters, blue color filters, green color filters, near-infrared color filters, short-wave infrared filters, and narrow-band filters). In some embodiments, filters of elements 1405 may be selectable (e.g., provided as a selectable filter wheel). In other embodiments, filters of element 1405 may be fixed as appropriate for a desired application of system 102. Although camera module 1406 is sometimes referred to herein as a visible light camera module as an example, it should be appreciated that camera module 1406 may be any suitable non-thermal camera module as described herein that generates images in response to incoming light having any suitable corresponding range of non-thermal wavelengths (e.g., visible light wavelengths, near infrared wavelengths, short-wave infrared wavelengths or other wavelengths that are relatively shorter than thermal infrared wavelengths).

In some embodiments, non-thermal images such as visible light images captured by visible light camera 1406 may be received by processor 195, which may be configured to fuse, superimpose, or otherwise combine the visible light images with the thermal images captured by infrared imaging module 100 as further described herein.

In some embodiments, visible light camera 1406 may be co-located with infrared imaging module 100 in a housing structure and oriented so that FOV 1407 of visible light camera 1406 at least partially overlaps FOV 1404 of infrared imaging module 100. In one example, infrared imaging module 100 and visible light camera 1406 may be implemented as a dual sensor module sharing a common substrate according to various techniques described in U.S. Provisional Patent Application No. 61/748,018 previously referenced herein. Such a dual sensor module implementation may include common circuitry and/or common restraint devices for infrared imaging and visible light imaging, thereby potentially reducing an overall size of system 102 as compared to embodiments where infrared imaging module 100 and visible light camera 1406 are implemented as individual modules. Additionally, the dual sensor module implementation may be adapted to reduce a parallax error between images captured by infrared imaging module 100 and visible light camera 1406 by reducing the distance between them.

Infrared images captured, processed, and/or otherwise managed by infrared imaging module 100 may be radiometrically normalized infrared images (e.g., thermal images). That is, pixels that make up the captured image may contain calibrated thermal data (e.g., temperature data). As discussed above in connection with FIG. 1, infrared imaging module 100 and/or associated components may be calibrated using appropriate techniques so that images captured by infrared imaging module 100 are properly calibrated thermal images. In some embodiments, appropriate calibration processes may be performed periodically by infrared imaging module 100 and/or processor 195 so that infrared imaging module 100, and hence the thermal images captured by it, may maintain proper calibration.

Radiometric normalization permits infrared imaging module 100 and/or processor 195 to efficiently detect, from thermal images, objects having a specific range of temperature. Infrared imaging module 100 and/or processor 195 may detect such objects efficiently and effectively, because thermal images of objects having a specific temperature may be easily discernible from a background and other objects, and yet less susceptible to lighting conditions or obscuring (e.g., obscured by clothing).

Figure 15:
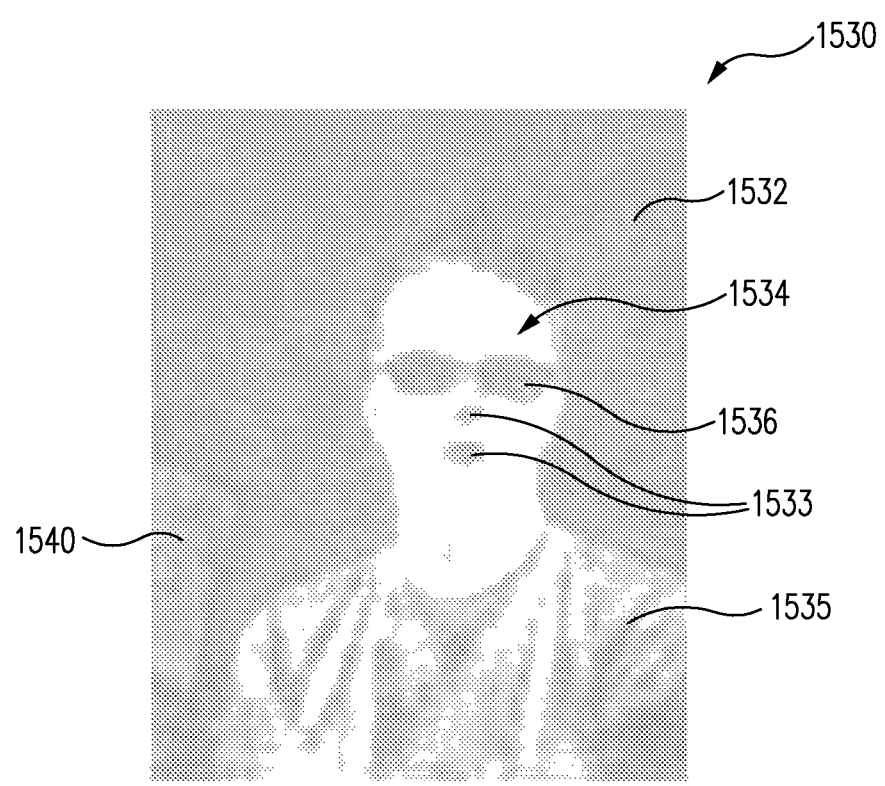
FIG. 15 illustrates an example thermal image that may be captured using an infrared imaging module and analyzed by a processor in accordance with an embodiment of the disclosure.

Also referring to FIG. 15, an example thermal image 1530 (shown as a user-viewable thermal image for ease of understanding, with lighter portions representing higher temperatures) that may be captured by infrared imaging module 100 is shown. As this example thermal image shows, a human such as person 1534 generally exhibits a higher temperature than a background such as background 1532. Furthermore, facial features 1533 such as a mouth and nostrils, glasses 1536, clothed portion 1535, and object 1540 (e.g., an object held in the person's hand) generally exhibit various temperatures that can be differentiated in a thermal image such as thermal image 1530. Thus, various features of a person such as person 1534 that is detected in a thermal image such as image 1530 may be accurately and yet efficiently differentiated and tracked using appropriate detection and tracking operations described herein and elsewhere.

In some embodiments, if visible light images captured by visible light camera 1406 are available, processor 195 may be configured to track features of a scene such as multiple individual people or even the face and facial features of an individual person based additionally or alternatively on the visible light images. For example, the visible light images may provide more detail and contrast than the thermal images in certain ambient light conditions, and thus may be analyzed using suitable face tracking algorithms in such favorable light conditions. In another example, both the visible light images and the thermal images may be analyzed to complementarily increase detection and tracking accuracy. In another example, the thermal images and the visible light images may be combined or fused as further described herein, and the combined or fused images may be analyzed to track the features of the scene. If processor 195 is configured to detect and track the features of a scene using the visible light images, processor 195 may be further configured to convert pixel coordinates of the tracked features in the visible light images to corresponding pixel coordinates in the thermal images.

In some embodiments, thermal images from one or more infrared imaging modules such as infrared imaging module 100 and non-thermal images from one or more non-thermal camera modules such as visible light camera module 1406 may be fused or combined to generate images having a higher definition, contrast, and/or detail.

The fusing or combining operations in accordance with one or more embodiments may be described in further detail with reference to FIG. 16, which is a flowchart of a process 1600 to combine or fuse the thermal images and the non-thermal (e.g., visible light) images. The combined images may include radiometric data and/or other infrared characteristics corresponding to scene 1430, but with significantly more object detail (e.g., contour or edge detail) and/or contrast than typically provided by the thermal or non-thermal images alone. Thus, for example, the combined images generated in these examples may beneficially provide sufficient radiometric data, detail, and contrast to allow easier recognition and/or interpretation of the presence, location, position, or other features of objects such as humans or animals in scene 1430.

Figure 16:
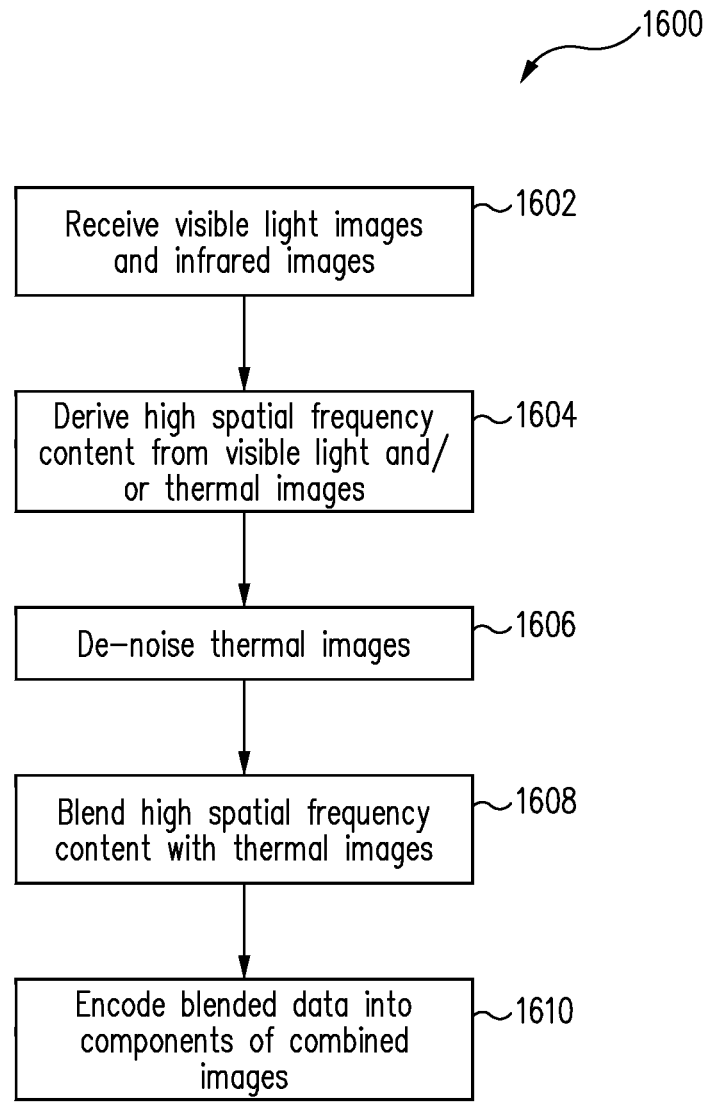
FIG. 16 illustrates a process for combining thermal images and visible light images in accordance with an embodiment of the disclosure.

Although the process described herein in connection with FIG. 16 discusses fusing or combining thermal images with visible light images as an example, it should be appreciated that the process may be applied to combining thermal images with any suitable non-thermal images (e.g., visible light images, near infrared images, short-wave infrared images, EMCCD images, ICCD images, or other non-thermal images).

At block 1602, visible light images and infrared images such as thermal images may be received. For example, visible light images of scene 1430 may be captured by visible light camera 1406 and the captured visible light images may be received by processor 195. Processor 195 may perforin various operations of process 1600 using both thermal images and non-thermal images, for example.

At block 1604, high spatial frequency content from one or more of the visible light and thermal images may be derived from one or more of the visible light and thermal images received in block 1602. High spatial frequency content derived according to various embodiments may include edge/contour details and/or high contrast pixels extracted from the one or more of the visible light and thermal images, for example.

In one embodiment, high spatial frequency content may be derived from the received images by performing a high pass filter (e.g., a spatial filter) operation on the images, where the result of the high pass filter operation is the high spatial frequency content. In an alternative embodiment, high spatial frequency content may be derived from the received images by performing a low pass filter operation on the images, and then subtracting the result from the original images to get the remaining content, which is the high spatial frequency content. In another embodiment, high spatial frequency content may be derived from a selection of images through difference imaging, for example, where one image is subtracted from a second image that is perturbed from the first image in some fashion, and the result of the subtraction is the high spatial frequency content. For example, optical elements 1403 of infrared imaging module 100 and/or optical elements 1405 of visible light camera 1406 may be configured to introduce vibration, de-focusing, and/or movement artifacts into a series of images captured by one or both of infrared imaging module 100 and visible light camera 1406. High spatial frequency content may be derived from subtractions of images such as adjacent images in the series.

In some embodiments, high spatial frequency content may be derived from only the visible light images or the thermal images. In other embodiments, high spatial frequency content may be derived from only a single visible light or thermal image. In further embodiments, high spatial frequency content may be derived from one or more components of the visible light and/or thermal mages, such as a luminance component of visible light images, for example, or a radiometric component of thermal images. Resulting high spatial frequency content may be stored temporarily (e.g., in memory 196) and/or may be further processed according to block 1608.

At block 1606, one or more thermal images may be de-noised. For example, processor 195 may be configured to de-noise, smooth, or blur one or more thermal images of scene 1430 using a variety of image processing operations. In one embodiment, removing high spatial frequency noise from the thermal images allows the processed thermal images to be combined with high spatial frequency content derived according to block 1604 with significantly less risk of introducing double edges (e.g., edge noise) to objects depicted in combined images of scene 1430.

In one embodiment, removing noise from the thermal mages may include performing a low pass filter (e.g., a spatial and/or temporal filter) operation on the images, where the result of the low pass filter operation is de-noised or processed thermal images. In a further embodiment, removing noise from one or more thermal images may include down-sampling the thermal images and then up-sampling the images back to the original resolution.

In another embodiment, processed thermal images may be derived by actively blurring thermal images of scene 1430. For example, optical elements 1403 may be configured to slightly de-focus one or more thermal images captured by infrared imaging module 100. The resulting intentionally blurred thermal images may be sufficiently de-noised or blurred so as to reduce or eliminate a risk of introducing double edges into combined images of scene 1430, as further described below. In other embodiments, blurring or smoothing image processing operations may be performed by processor 195 on the received thermal images as an alternative or supplement to using optical elements 1403 to actively blur thermal images of scene 1430. Resulting processed thermal images may be stored temporarily (e.g., in memory 196) and/or may be further processed according to block 1608.

At block 1608, high spatial frequency content may be blended with one or more thermal images. For example, processor 195 may be configured to blend high spatial frequency content derived in block 1604 with one or more thermal images of scene 1430, such as the processed thermal images provided in block 1606.

In one embodiment, high spatial frequency content may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images of scene 1430, but may not exist within the interior of such objects. In such embodiments, blended image data may simply include the high spatial frequency content, which may subsequently be encoded into one or more components of combined images, as described in block 1610.

For example, a radiometric component of thermal images may be a chrominance component of the thermal images, and the high spatial frequency content may be derived from the luminance and/or chrominance components of visible light images. In this embodiment, combined images may include the radiometric component (e.g., the chrominance component of the thermal images) encoded into a chrominance component of the combined images and the high spatial frequency content directly encoded (e.g., as blended image data but with no thermal image contribution) into a luminance component of the combined images. By doing so, a radiometric calibration of the radiometric component of the thermal images may be retained. In similar embodiments, blended image data may include the high spatial frequency content added to a luminance component of the thermal images, and the resulting blended data encoded into a luminance component of resulting combined images.

In other embodiments, high spatial frequency content may be derived from one or more particular components of one or a series of visible light and/or thermal images, and the high spatial frequency content may be encoded into corresponding one or more components of combined images. For example, the high spatial frequency content may be derived from a luminance component of visible spectrum images, and the high spatial frequency content, which in this embodiment is all luminance image data, may be encoded into a luminance component of combined images.

In another embodiment, high spatial frequency content may be blended with thermal images using a blending parameter and an arithmetic equation. For example, in one embodiment, the high spatial frequency content may be derived from a luminance component of visible light images. In such an embodiment, the high spatial frequency content may be blended with a corresponding luminance component of thermal image according to a blending parameter and a blending equation to produce blended image data. The blended image data may be encoded into a luminance component of combined images, for example, and the chrominance component of the thermal images may be encoded into the chrominance component of the combined images. In embodiments where the radiometric component of the infrared images may be their chrominance component, the combined images may retain a radiometric calibration of the thermal images. In other embodiments, portions of the radiometric component may be blended with the high spatial frequency content and then encoded into combined images.

More generally, the high spatial frequency content may be derived from one or more components of visible light images and/or thermal image. In such an embodiment, the high spatial frequency content may be blended with one or more components of the thermal images to produce blended image data (e.g., using a blending parameter and a blending equation), and resulting combined images may include the blended image data encoded into corresponding one or more components of the combined images. In some embodiments, the one or more components of the blended data do not have to correspond to the eventual one or more components of the combined images (e.g., a color space/format conversion may be performed as part of an encoding process).

A blending parameter value may be selected by a user or may be automatically determined by processor 195 according to context or other data, for example, or according to an image enhancement level expected by system 102. In some embodiments, the blending parameter may be adjusted or refined while combined images are being displayed (e.g., by display 197). In some embodiments, a blending parameter may be selected such that blended image data includes only thermal characteristics, or, alternatively, only visible light characteristics. A blending parameter may also be limited in range, for example, so as not to produce blended data that is out-of-bounds with respect to a dynamic range of a particular color space/format or a display.

In addition to or as an alternative to the processing described above, processing according to the high contrast mode may include one or more processing steps, ordering of processing steps, arithmetic combinations, and/or adjustments to blending parameters as disclosed in U.S. patent application Ser. No. 13/437,645 previously referenced herein. For example, the following equations may be used to determine the components Y, Cr and Cb for the combined images with the Y component from the high pass filtered visible light images and the Cr and Cb components from the thermal images.

$$hp\_y\_vis = highpass(y\_vis)$$

$$(y\_ir, cr\_ir, cb\_ir) = colored(lowpass(ir\_signal\_linear))$$

In the above equations, highpass(y_vis) may be high spatial frequency content derived from high pass filtering a luminance component of visible light images. Colored(lowpass(ir_signal_linear)) may be the resulting luminance and chrominance components of the thermal images after the thermal images are low pass filtered. In some embodiments, the thermal images may include a luminance component that is selected to be 0.5 times a maximum luminance (e.g., of a display and/or a processing step). In related embodiments, the radiometric component of the thermal images may be the chrominance component of the thermal images. In some embodiments, the y_ir component of the thermal images may be dropped and the components of the combined images may be (hp_y_vis, cr_ir, cb_ir), using the notation above.

In another embodiment, the following equations may be used to determine the components Y, Cr and Cb for combined images with the Y component from the high pass filtered visible light images and the Cr and Cb components from the thermal images.

$$comb\_y = y\_ir + alpha \times hp\_y\_vis$$

$$comb\_cr = cr\_ir$$

$$comb\_cb = cb\_ir$$

The variation of alpha thus gives the user an opportunity to decide how much contrast is needed in the combined images. With an alpha of close to zero, the thermal images alone will be shown, but with a very high alpha, very sharp contours/edges can be seen in the combined images. Theoretically, alpha can be an infinitely large number, but in practice a limitation will probably be necessary, to limit the size of alpha that can be chosen to what will be convenient in the current application.

Once the high spatial frequency content is blended with one or more thermal images, processing may proceed to block 1610, where blended data may be encoded into components of the combined images in order to form the combined images.

At block 1610, the blended data may be encoded into one or more components of the combined images. For example, processor 195 may be configured to encode blended data derived or produced in accordance with block 1608 into combined images that increases, refines, or otherwise enhances the information conveyed by either the visible light or thermal images viewed by themselves. In some embodiments, encoding blended image data into a component of combined images may include additional image processing operations, for example, such as dynamic range adjustment, normalization, gain and offset operations, noise reduction, and color space conversions, for instance.

In addition, processor 195 may be configured to encode other image data into combined images. For example, if blended image data is encoded into a luminance component of combined images, a chrominance component of either visible light images or thermal images may be encoded into a chrominance component of combined images. Selection of source images may be made through user input, for example, or may be determined automatically based on context or other data. More generally, in some embodiments, a component of combined images that is not encoded with blended data may be encoded with a corresponding component of visible light images or thermal images. By doing so, a radiometric calibration of thermal images and/or a color space calibration of visible light images may be retained in the resulting combined images.

In some embodiments, at least some part or some functionalities of processor 195 described herein may be implemented as part of infrared imaging modules 100, for example, at processing module 160 described above in connection with FIG. 3. In some embodiments, at least some part or some functionalities of processor 195 may be part of or implemented with other existing processors of an external device such as a mobile phone, a tablet device, a mobile handset, a laptop computer, a desktop computer, an automobile information display system, or any other devices that may be used to present monitoring information from a monitoring system. In other embodiments, processor 195 may interface and communicate with such other external processors and components associated with such processors.

Figure 17:
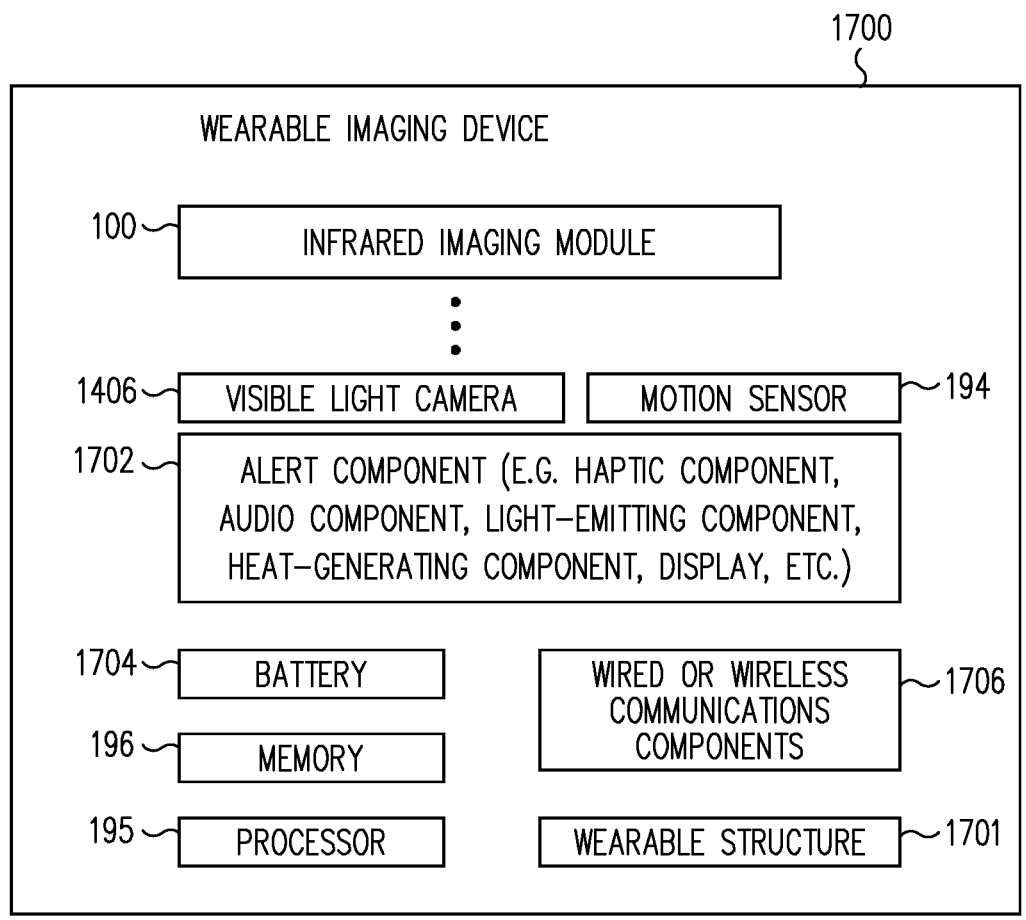
FIG. 17 illustrates a block diagram of a host system that is implemented as a wearable imaging device with infrared imaging modules and alert components in accordance with an embodiment of the disclosure.

In one suitable configuration that is sometimes discussed herein as an example, system 102 may be implemented as a wearable device such as wearable imaging device 1700 of FIG. 17. As shown in FIG. 17, wearable imaging device 1700 may include one or more wearable structures such as wearable structure 1701 and one or more infrared imaging modules 100. Wearable imaging device 1700 may, for example, be a wearable multisensor array that includes several infrared imaging modules 100 that each have a field of view (FOV) that covers a portion of a scene such as scene 1430.

In one embodiment, wearable structure 1701 may be a head piece such as a protective helmet that protects a wearer's head from injury due to a fall, a falling object or a projectile such as a bullet. However, this is merely illustrative. If desired, wearable structure 1701 may be another wearable structure such as a hat, a backpack, an arm band, a leg strap, goggles, glasses, or other suitable clothing piece on which infrared imaging devices can be mounted or integrated.

As shown in FIG. 17, wearable imaging device 1700 may include one or more visible light cameras 1406, one or more motion sensors 194, one or more batteries such as battery 1704, memory such as memory 196, one or more processors such as processor 195, communications components such as wired or wireless communications components 1706, and one or more wearer alert modules such as alert component 1702.

Alert component 1702 may include one or more haptic components, audio components, light-emitting components, heat-generating components, displays such as display 197 or other suitable components for providing an alert to a wearer of wearable imaging device 1700 in response to the detection of an object in image data from infrared imaging module(s) 100 and/or visible light camera(s) 1406).

Haptic components may include mechanical vibrators, piezoelectric components, or other movable components for generating motion in device 1700 to alert the wearer of device 1700. Audio components may include one or more speakers. Light-emitting components may include one or more light-emitting diodes, light bulbs, portions of a display, other light-generating components. Heat-generating components may include resistive heating elements such as ceramic heating elements or other suitable components for generating heat to alert the wearer of device 1700 of a detected object in a thermal and/or visible light image. A display may include a monochrome or color display that uses any suitable display technology (e.g., liquid-crystal, light-emitting-diode, or other display technology).

Battery 1704 may be a lithium ion battery, a lithium polymer battery, a nickel cadmium battery, a nickel metal hydride battery, or other suitable type of battery technology for a portable wearable imaging device. System 1700 may include one, two, three, or more than three batteries or, if desired, system 1700 may be powered by an external battery or battery pack (e.g., through a wired connection to a battery in a backpack or other portable vessel).

Memory 196 may include one or more memory devices to store data and information, including thermal images and monitoring information. The one or more memory devices may include various types of memory for thermal image and other information storage including volatile and non-volatile memory devices, such as RAM (Random Access Memory), ROM (Read-Only Memory), EEPROM (Electrically-Erasable Read-Only Memory), flash memory, and/or a disk drive. In one embodiment, thermal images and monitoring information stored in the one or more memory devices may be retrieved later for purposes of reviewing and/or further diagnosing the conditions of the environment monitored by device 1700. In various embodiments, processor 195 may be configured to execute software instructions stored on memory 196 to perform various methods, processes, or operations in the manner described herein.

Display 197 may be configured to present, indicate, or otherwise convey monitoring information generated by processor 195, infrared imaging modules 100, and/or visible light cameras 1406. In various embodiments, display 197 may be implemented with an electronic display screen, such as a liquid crystal display (LCD), a cathode ray tube (CRT), light-emitting-diode (LED) or various other types of generally known video displays and monitors. Display 197 according to such embodiments may be suitable for presenting user-viewable thermal images converted by processor 195 from thermal images captured by infrared imaging modules 100.

In some embodiments, existing display screens on external devices such as mobile phones, tablet devices, laptop computers, desktop computers, automobile information display systems, or any other devices that may receive thermal images and/or the monitoring information from wearable imaging device 1700 to present the monitoring information to a user.

In this regard, communications components 1706 may be configured to handle, manage, or otherwise facilitate wired and/or wireless communication between various components of wearable imaging device 1700 and between wearable imaging device 1700 and an external device. For example, wearable imaging device 1700, may transmit and receive data to and from other wearable imaging devices 1700 or to and from other equipment such as a base station through communications components 1706. In another example, wearable imaging device 1700 may transmit and receive data to and from an external device, which may receive and further process raw/processed thermal images and/or monitoring information for presentation to a user, through communications components 1706 configured to manage wired and/or wireless connections.

In various embodiments, communications components 1706 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), mobile cellular component, a wireless satellite component, or other appropriate wireless communication components. Communication module 1706 may also be configured for a proprietary wireless communication protocol and interface based on radio frequency (RF), microwave frequency (MWF), infrared frequency (IRF), and/or other appropriate wireless transmission technologies. Communications components 1706 may include an antenna coupled thereto for wireless communication purposes. Thus, in one example, communications components 1706 may handle, manage, or otherwise facilitate wireless communication by establishing wireless link to other wearable imaging device 1700, to a base station, to a wireless router, hub, or other appropriate wireless networking devices.

In various embodiments, communications components 1706 may be configured to interface with a wired network via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communication module 1706. Communications components 1706 may be configured to communicate over a wired link (e.g., through a network router, switch, hub, or other network devices) for wired communication purposes. For example, a wired link may be implemented with a power-line cable, a coaxial cable, a fiber-optics cable, or other appropriate cables or wires that support corresponding wired network technologies.

In some embodiments, wearable imaging device 1700 may comprise as many such communication components 1706 as desired for various applications of wearable imaging device 1700 to suit various types of monitoring environments. In other embodiments, communication components 1706 may be integrated into or implemented as part of various other components of wearable imaging device 1700. For example, infrared imaging module 100, processor 195, and display 197 may each comprise a subcomponent that may be configured to perform the operations of communications components 1706, and may communicate via wired and/or wireless connection without separate components 1706.

Motion sensors 194 may be monitored by and provide information to infrared imaging modules 100 and/or processor 195 for performing various NUC techniques described herein.

In various embodiments, one or more components of wearable imaging device 1700 may be combined and/or implemented or not, as desired or depending on application requirements. For example, processor 195 may be combined with infrared imaging modules 100, memory 196, and/or communications components 1706. In another example, processor 195 may be combined with infrared imaging modules 100 with only certain operations of processor 195 performed by circuitry (e.g., processor, logic device, microprocessor, microcontroller, etc.) within infrared imaging modules 100.

If desired, wearable imaging device 1700 may include one or more alert components associated with each infrared imaging module 100. In this way, when an object such as a person is detected in images from one of infrared imaging modules 100, alert components associated with that infrared imaging device (e.g., one or more alert components 1702 that are co-located with that infrared imaging device) can be activated to alert the wearer to both the presence and the location of the detected person.

Infrared imaging modules 100 of wearable imaging device 1700 may be configured to capture, process, and/or otherwise manage infrared images (e.g., including thermal images) of a scene such as scene 1430 (see FIG. 14). In this regard, infrared imaging modules 100 may be attached, mounted, installed, or otherwise disposed at any suitable location on or within device 1700 that allows at least a portion of the scene to be placed within field of view (FOV) 1404 of each infrared imaging module 100.

Figure 18:
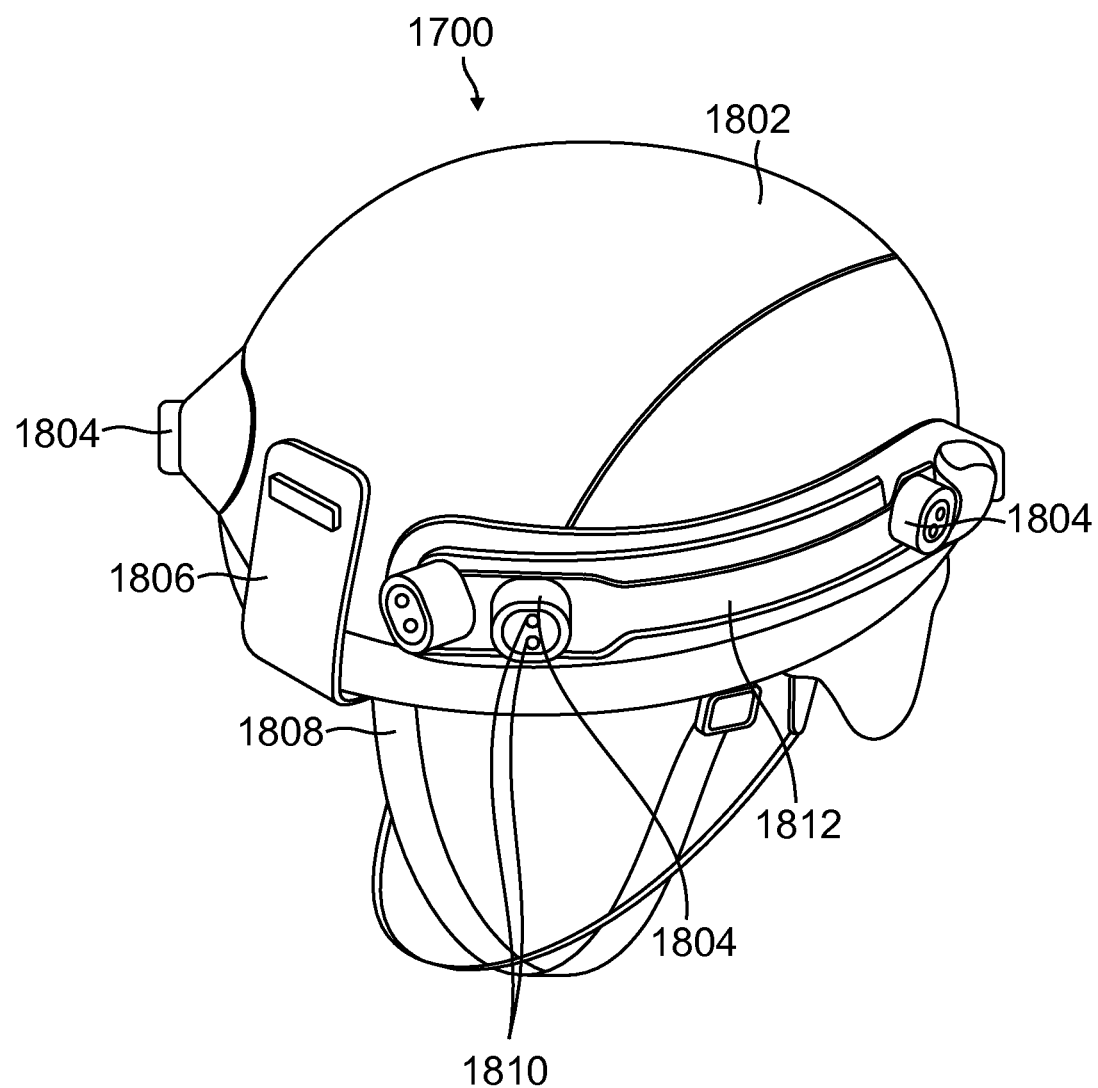
FIG. 18 illustrates a wearable imaging device that is implemented as a multidirectional threat monitoring helmet in accordance with an embodiment of the disclosure.

In one embodiment, several infrared imaging modules may be disposed around some or all of a wearable structure such as a helmet as shown in FIG. 18. In the example of FIG. 18, wearable structure 1701 of FIG. 17 is implemented as a protective head covering structure such as protective helmet 1802. A wearable imaging device that has been implemented as multidirectional threat monitoring helmet of the type shown in FIG. 18 may be provided with imaging modules 1804 at various locations on helmet 1802. For example, imaging modules 1804 may be disposed at various locations around a circumference of a wearable structure such as helmet 1802. Each imaging module 1804 may include an infrared imaging module 100, a visible light camera 1406, an infrared imaging module 100 and a visible light camera 1406, more than one infrared imaging module 100, more than one visible light camera 1406 or any other suitable combination of individual imaging components 1810.

Wearable imaging device 1700 may include imaging components 1810 in a housing such as housing 1812. In some embodiments, housing 1812 may include clamps, clips, suction cups, or other suitable attachment mechanisms to releasably attach housing 1812, and hence imaging components (e.g., infrared imaging modules 100), to a suitable wearable mounting structure such as helmet 1802. In some embodiments, housing 1812 may be fixedly attached to a mounting structure with an appropriate fastener.

Additional components such as processor 195, communications components 1706, and memory 196 may be located within housing 1812 or within other portions of helmet 1802. Wearable imaging device 1700 may include additional structures such as chin strap 1808 for holding helmet 1802 in place on a wearer's head, and flap structure 1806. Flap structure 1806 may be a structural component and/or a functional component of device 1700. For example, flap structure 1806 may include a display such as a flip-down display that the wearer of device 1700 can move into and out of view for viewing images based on image data captured using imaging components 1810.

Infrared imaging modules 100 may be attached to a wearable structure such as a helmet as needed in order to place up to 360 degrees of a real-world scene within the FOV of the infrared imaging modules.

Figure 19:
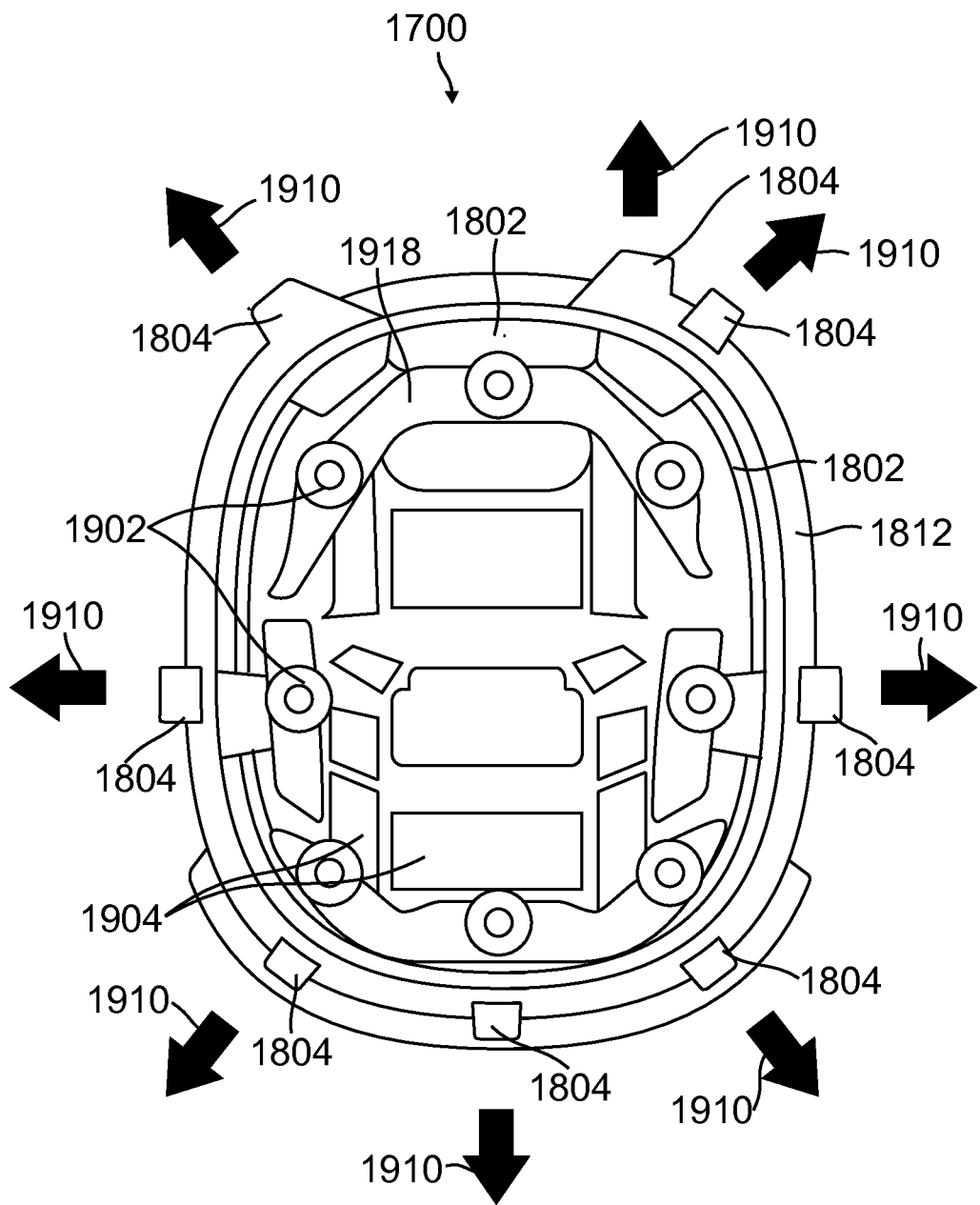
FIG. 19 illustrates a top view of the multidirectional threat monitoring helmet of FIG. 18 showing how multiple imaging modules may be used to monitor portions of the surrounding environment in multiple directions in accordance with an embodiment of the disclosure.

FIG. 19 is a top view of wearable imaging device 1700 showing how multiple imaging modules 1804 (each containing one or more imaging components such as infrared imaging modules 100 and/or visible light cameras 1406) may be disposed around helmet 1802 and pointed in a particular direction 1910. A wearable imaging device configured in this way may allow each imaging module 1804 to view a portion of a complete 360 degree scene around the wearer of device 1700. In this way, device 1700 may be used to monitor potential threats to the wearer of device 1700 in a multidirectional manner.

As shown in FIG. 19, a wearable imaging device 1700 that is implemented as a multidirectional threat monitoring helmet may include additional structures and components such as components 1902, 1904, and 1918. In various embodiments, components 1902, 1904, and 1918 may each be functional components (e.g., additional infrared or visible light imaging devices, processors, memory, batteries, communications components, motion sensors, alert components, or other functional components) or structural components such as strength reinforcing structures (e.g., woven bulletproof structures, metal or polymer strengthening components, etc.). In one suitable example, components 1902 may be alert components such as alert components 1702 of FIG. 17 that are associated with each imaging module 1804. Alert components may be positioned at various locations around a circumference of helmet 1802 (e.g., at locations corresponding to the positions of infrared imaging modules disposed around the circumference).

Figure 20:
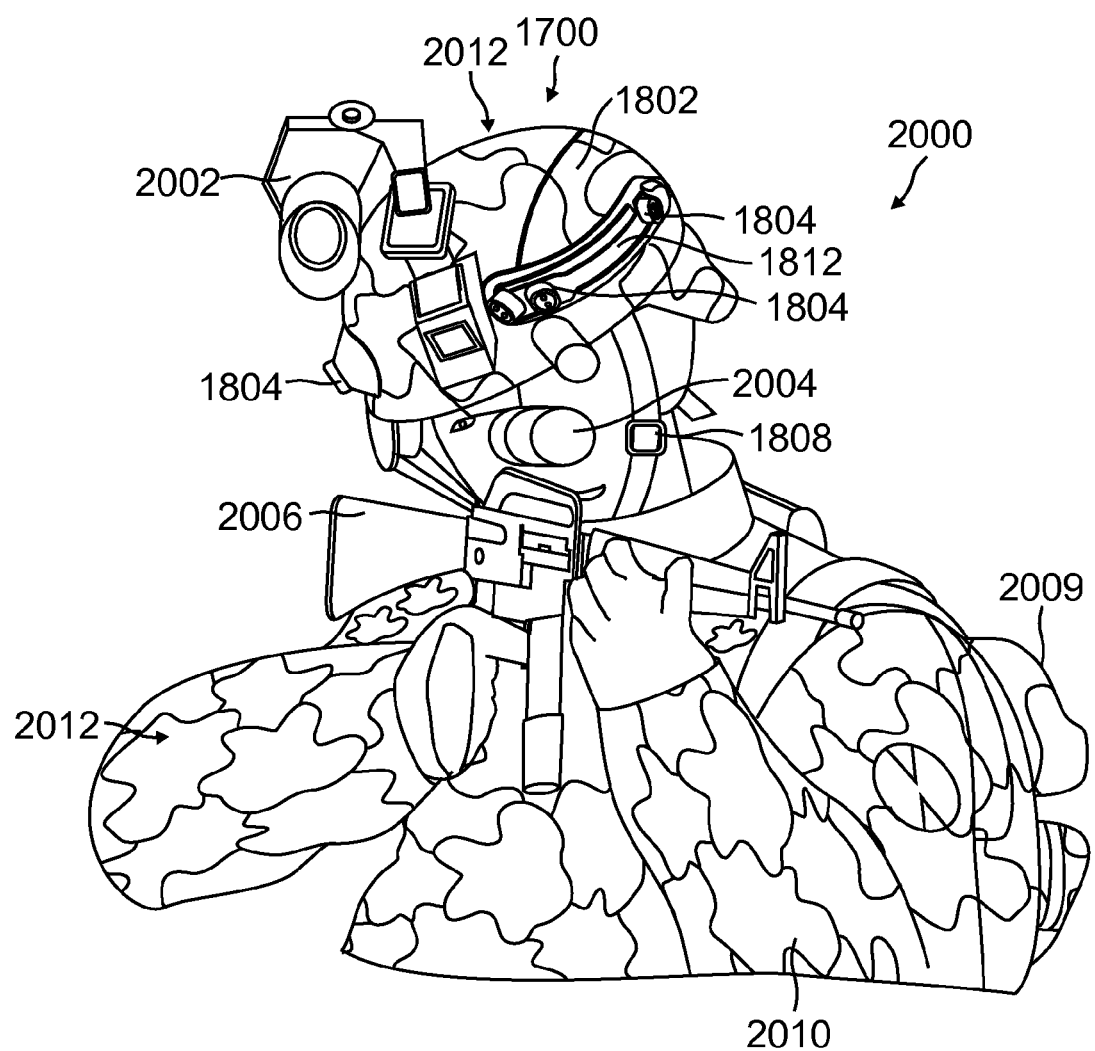
FIG. 20 illustrates a wearer of a multidirectional threat monitoring helmet wearing the multidirectional threat monitoring helmet along with other systems in accordance with an embodiment of the disclosure.

As shown in FIG. 20, in some embodiments, wearable imaging device 1700 may be integrated into a larger wearable system such as system 2000. System 2000 may be an individual tactical defense system for a person such as soldier 2010 that includes wearable imaging device 1700, additional cameras such as camera 2002, weapons such as rifle 2006, display devices such as display 2004, and backpack 2009.

Backpack 2009 may be used to carry a power supply, additional memory, or other components or devices for operating device 1700 and/or other components of system 2000.

Display 2004 may be a portion of wearable imaging device 1700 (e.g., a flip-down, or drop-down display that displays images captured using infrared imaging modules 100 and/or visible light cameras 1406 mounted in housing 1812 on helmet 1802) or may be a separate display component. Display 2004 may be used to display images from other portions of system 2000 (e.g., additional camera 2002 or weapon 2006).

As shown in FIG. 20, helmet 1802 may include a patterned cover material such as such as patterned material 2012 that matches patterned material 2012 on other portions of a wearer's clothing to reduce the visibility of wearer 2010 to others. Patterned material 2012 may be a patterned fabric, a patterned coat of paint, or other patterned material. Patterned material 2012 may have a camouflage pattern suitable for an environment in which wearer 2010 is located.

In one embodiment, wearable imaging device 1700 (e.g., processor 195) may be configured to generate image data such as thermal images from multiple imaging modules 1804 and to detect from the thermal images a contiguous region of pixels (also referred to as a "blob" or "warm blob") having a temperature approximately in the range of a person, for example, between approximately 75° F. (e.g., clothed part of a body) and approximately 110° F. (e.g., exposed part of a body such as a face and hands). Such a "warm blob" may indicate a presence of a person in the vicinity of device 1700, and may be analyzed further as described herein to ascertain the presence of the person, track the motion of the person, determine the location of the person, and/or determine various other attributes associated with the detected person.

Processor 195 may be configured to receive thermal image data captured by infrared imaging modules 100. Processor 195 may be configured to perform, on the received thermal images of a scene, various thermal image processing and analysis operations as further described herein, for example, to detect and track a person or an animal, and determine various attributes associated with the person or animal. Processor 195 may be configured to collect, compile, analyze, or otherwise process the outcome of the thermal image processing and analysis operations to generate monitoring information such as threat detection information.

In one example, wearable imaging device 1700 may be configured to determine the presence and location of a human (or an animal), and generate an alert upon detection of the human (or animal). In this regard, wearable imaging device 1700 may be configured to detect and track the location of the person or animal and, if desired, detect and track a face and facial features or other features of a person in the thermal images according to one or more embodiments of the disclosure. Wearable imaging device 1700 may be configured to alert the wearer of device 1700 to the location of the detected person (or animal) by activating an alert component located near the imaging module that generated the images in which the person was detected. For example, if a person is located behind the wearer, a vibration, a sound, and/or heat (as examples) at the rear of the helmet may be generated to form a location-specific alert for the wearer of the detected person behind them.

In other embodiments, if visible light images captured by visible light cameras 1406 in imaging modules 1804 are available, wearable imaging device 1700 may be configured to track features of a scene such as multiple individual people or even the face and facial features of an individual person based additionally or alternatively on the visible light images. For example, the visible light images may provide more detail and contrast than the thermal images in certain ambient light conditions, and thus may be analyzed using suitable face tracking algorithms in such favorable light conditions. In another example, both the visible light images and the thermal images may be analyzed to complementarily increase detection and tracking accuracy. In another example, the thermal images and the visible light images may be combined or fused as further described herein, and the combined or fused images may be analyzed to track the features of the scene. If wearable imaging device 1700 is configured to detect and track the features of a scene using the visible light images, processor 195 may be further configured to convert pixel coordinates of the tracked features in the visible light images to corresponding pixel coordinates in the thermal images.

In one embodiment, wearable imaging device 1700 may be configured to detect a presence of exhaled breaths of a person or animal. Exhaled breaths may appear in the thermal images for a short period after each exhalation, and may be detectable as a distinct plume of gas rich in $CO_2$ and having a temperature slightly lower than the body temperature. Thus, by analyzing images to detect a group of pixels having radiometric properties characteristic of such gases, exhaled breaths may be detected. Moreover, as discussed above in connection with optical elements 1403 of infrared imaging module 100, narrow-band filters may be utilized in some embodiments of modules 100 in wearable imaging device 1700, so that infrared radiation absorbed and emitted by $CO_2$ may be shown more clearly and in higher contrast to infrared radiation from other substances for an improved detection of exhaled breaths. Wearable imaging device 1700 may be configured to generate an alert such as a location-specific alert when, for example, an exhaled breath is detected.

In another embodiment, wearable imaging device 1700 may be configured to detect breathing by analyzing infrared images captured using one or more infrared imaging modules 100 to detect periodic variations in the temperature and/or shape of a detected oronasal region of a detected person or animal. For example, wearable imaging device 1700 may be configured to detect periodic alteration of slightly higher and lower temperatures in the nostrils and/or periodic movement of the oronasal region, which may be indicative of periodic inhalation and exhalation cycles. It is also contemplated that wearable imaging device 1700 may be configured to detect breathing by performing other suitable analysis and/or processing operations, for example, for detecting various periodic variations indicative of breathing. In various embodiments, processor 195 may be configured to detect breathing by performing any combination of breathing detection operations described herein.

In another example, monitoring information that may be generated by wearable imaging device 1700 includes an approximate body temperature of person or animal and/or an alert to warn of detected objects having a temperature similar to a typical human or animal. As described above, wearable imaging device 1700 may be configured to locate and track a person or animal in the thermal images by analyzing the thermal images, visible light images, and/or combined thermal-visible light images from imaging modules 1804. In one embodiment, processor 195 may be configured to determine an approximate body temperature by aggregating, averaging, and/or otherwise analyzing the radiometric data (e.g., temperature data) associated with thermal image pixels that correspond to the person or animal.

In other embodiments wearable imaging device 1700 may be configured to calculate an approximate body temperature by performing other appropriate processing and analysis operations on the thermal images and the radiometric data contained therein. In various embodiments, processor 195 may be configured to generate an alert if an object having the approximate body temperature of a human, as determined from the thermal images is detected.

In yet another example of generating monitoring information, wearable imaging device 1700 may be configured to analyze the thermal images to determine the approximate posture of a detected person (e.g., whether the person is standing, crouching, prone, sitting, walking, running, etc.) or the approximate orientation of the detected person (e.g., facing toward or facing away from an infrared imaging module 100). As described above, the location of body, face, and facial features of a detected person or animal may be tracked in the thermal images. In one embodiment, wearable imaging device 1700 may be configured to determine the approximate posture by analyzing the location and/or orientation of the face relative to the body.

In another embodiment, the profile and/or the aspect ratio of the person in the thermal images may be analyzed to determine the posture. In various embodiments, wearable imaging device 1700 may be configured to determine the posture of the person by performing any combination of posture detection operations described herein and other appropriate thermal image analysis operations for posture detection. In various embodiments, wearable imaging device 1700 may be configured to receive a selection of an alert-triggering posture from a user, and generate an alert if the approximate posture of the person is detected as matching the selected posture. Thus, for example, a user may choose to be notified or warned if the person is in a crouched position facing toward the user, so that the user may take precautionary measures to defend against a potential threat.

Figure 21:
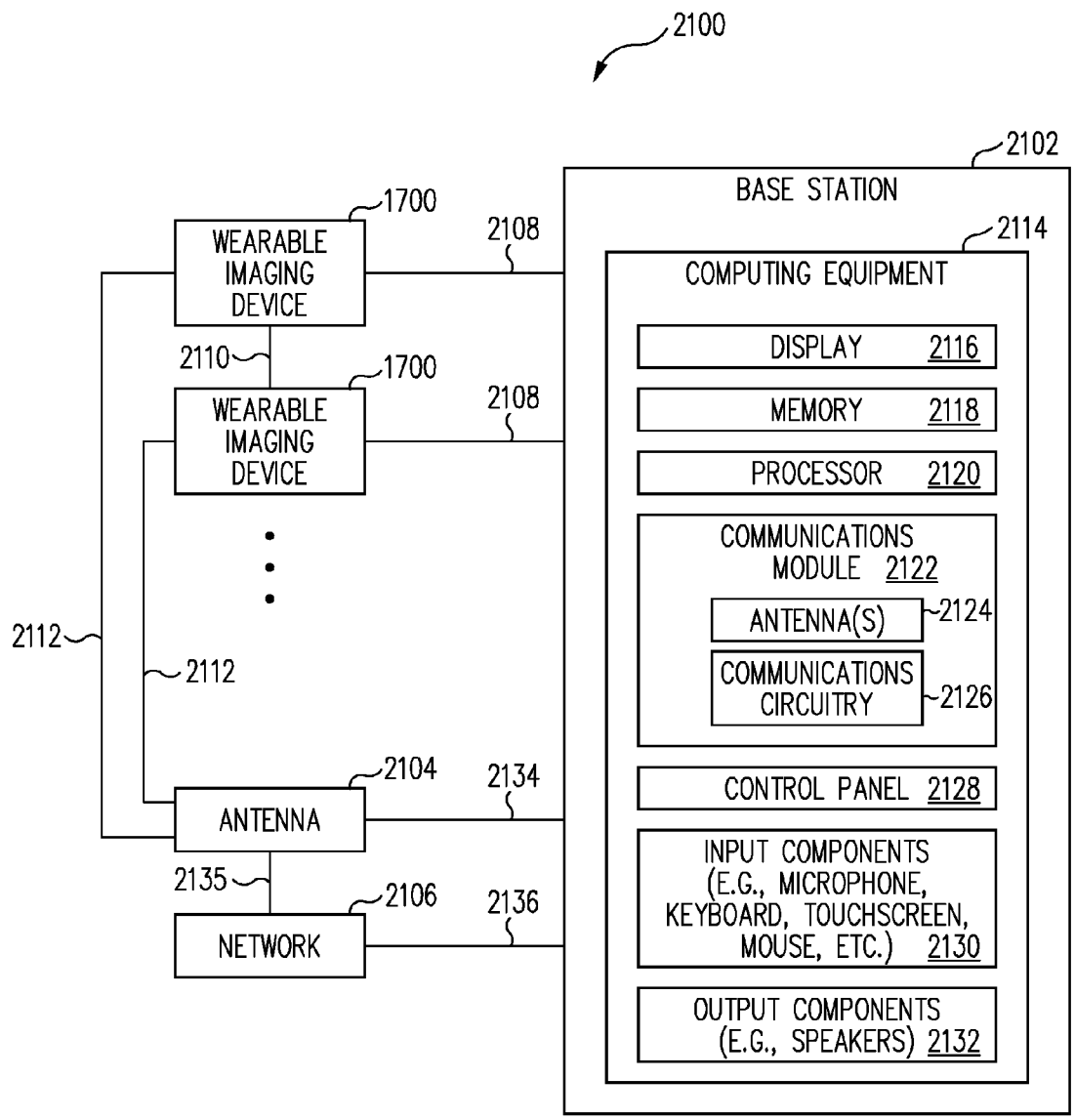
FIG. 21 illustrates a block diagram of a threat monitoring system that includes wearable imaging devices in accordance with an embodiment of the disclosure.

FIG. 21 is a block diagram showing how multiple wearable imaging devices may be communicatively coupled to each other and to other components of a larger system. As shown in FIG. 21, system 2100 may include one or more wearable imaging device 1700 and a base station 2102. Each wearable imaging device 1700 may be communicatively coupled to each other wearable imaging device over a communications path 2110 (e.g., a wireless radio-frequency communications path). Each wearable imaging device 1700 may be communicatively coupled to base station 2102 over communications paths 2108 (e.g., a wireless radio-frequency communications path). In some embodiments, one of wearable imaging devices 1700 may serve as a base station (e.g., a wearable imaging device worn by a commander of a unit of soldiers wearing devices 1700). However, this is merely illustrative. In some embodiments, wearable imaging devices 1700 may communicate with base station 2102 through an antenna such as antenna 2104 and/or through a network such as network 2106 (e.g., a closed proprietary network or a global network such as the Internet).

For example, wearable imaging devices 1700 may transmit signals to antenna 2104 over paths 2112 (e.g., wired or wireless communications paths) and antenna 2104 may transmit some or all of the received signals to base station 2102 over path 2134 (e.g., a wired or wireless communications path). As another example, wearable imaging devices 1700 may transmit signals to antenna 2104 over paths 2112, antenna 2104 may transmit some or all of the received signals network 2106 over path 2135 (e.g., a wired or wireless communications path) and base station 2102 may receive information associated with the signals over path 2136 (e.g., a wired or wireless communications path).

As shown in FIG. 21, base station 2102 may include computing equipment 2114. Computing equipment 2114 may be located in a common geographical location with wearable imaging devices 1700 or may be located remote from wearable imaging devices 1700. For example, base station 2102 may be a remote command center that communicates with soldiers in various geographical locations or base station 2102 may be a field command center from which the soldiers are locally deployed.

Computing equipment 2114 may include various computing modules suitable for communicating with devices 1700 and for processing and storing images and/or other monitoring information received from devices 1700. Computing equipment 2114 may include one or more displays 2116, storage such as memory 2118, processing equipment such as processor 2120, communications components such as communications module 2122, control components such as control panel 2128, input components such as input components 2130 and/or output components such as output components 2132. Communications module 2122 may include one or more antennas 2124 and additional communications circuitry 2126 (e.g., radio-frequency front end circuitry, signal generation circuitry, modulation circuitry, etc.). Input components 2130 may include a microphone, a keyboard, a touchscreen, a mouse, and/or other components suitable for receiving user input. Output components may include one or more speakers, headphones, or other output components.

Figure 22:
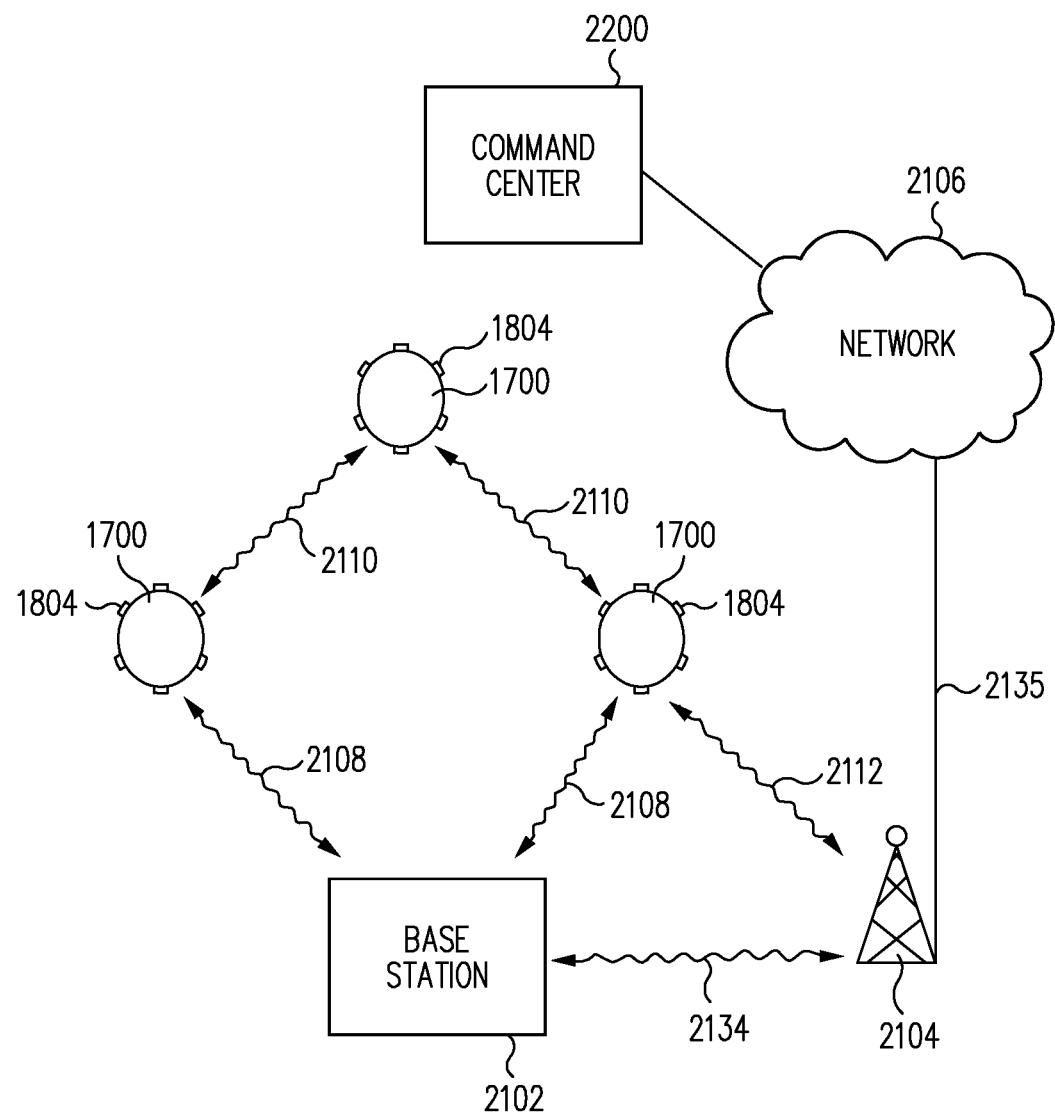
FIG. 22 illustrates a threat monitoring system and shows how one or more multidirectional threat monitoring helmets may communicate with each other and with a base station in accordance with an embodiment of the disclosure.

As shown in FIG. 22, multiple wearable imaging devices 1700 may be used to communicate with each other, with base station 2102 and, if desired, an additional remote command center such as command center 2200. Command center 2200 may communicate with base station 2102 and/or devices 1700 through antenna 2104 and network 2106. For example, command center 2200 may be located on a ship, underground, in a different country, on a different continent, or may be otherwise remotely located from wearable imaging devices 1700. In some embodiments, when one of devices 1700 detects an object such as a potential human threat, that device may alert the wearer of the device and may also transmit detection and location information associated with the detected object to other devices 1700 which may, in turn, alert the wearers of those devices to the detection and location of the object.

Figure 23:
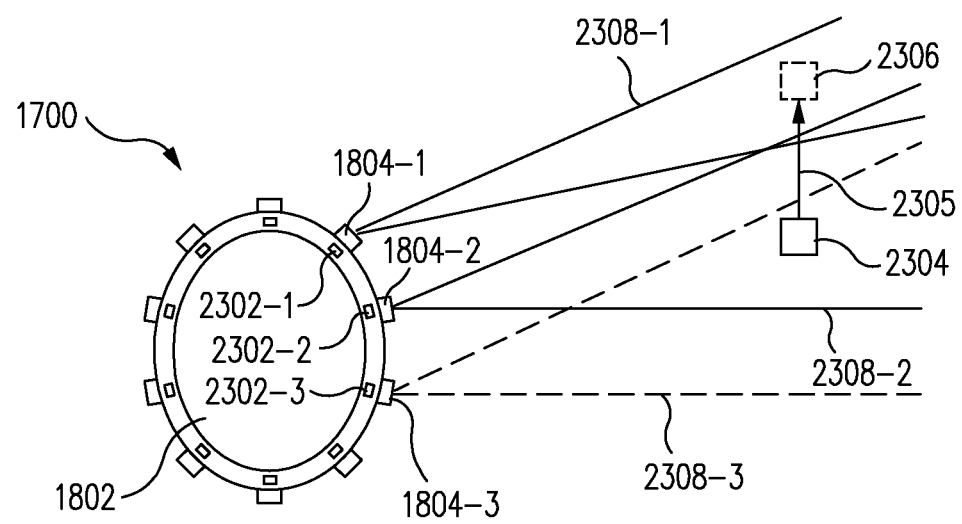
FIG. 23 illustrates detection of a moving object with multiple infrared imaging modules on a multidirectional threat monitoring helmet in accordance with an embodiment of the disclosure.

FIG. 23 is a diagram of wearable imaging device 1700 showing how a selected one of imaging modules 1804 may be used to detect an object in a given location. As shown in FIG. 23, device 1700 has several imaging modules such as modules 1804-1, 1804-2, and 1804-3 disposed around helmet 1802. As shown, imaging module 1804-1 has a field of view 2308-1, imaging module 1804-2 has a field of view 2308-2, and imaging module 1804-3 has a field of view 2308-3. When an object such as object 2304 (e.g., a human, an animal, or other detectable object) enters the field of view of a particular imaging module, device 1700 may use images captured using that imaging module to detect the object. In the example of FIG. 23, object 23 is located in the field of view of both imaging modules 1804-2 and 1804-3.

In the example of FIG. 23, an alert component is also associated with each imaging module. Alert component 2302-1 is located next to imaging module 1804-1, alert component 2302-2 is located next to imaging module 1804-2, and alert component 2302-3 is located next to imaging module 1804-3. In this way, when object 2304 is detected in the fields of view of modules 1804-2 and 1804-3, alert components 2302-2 and 2302-3 can be operated to alert the wearer of device 1700 to the presence and location of object 2304.

If desired, alert components 2302-2 and 2302-3 can be operated in conjunction to generate an alert for the wearer that seems to originate between modules 2302-2 and 2302-3 when an object is detected by modules 2302-2 and 2302-3. In this way, device 1700 may be able to alert the wearer to the location of an object to higher resolution than the number of alert components. Alert components 2302-1, 2302-2, and 2302-3 may each be an implementation of one of alert components 1702 of FIG. 17. The one-to-one correspondence of alert components to imaging modules in FIG. 23 is merely illustrative. If desired, device 1700 may include more alert components than imaging modules, fewer alert components than imaging modules, or one or more continuous alert components that can be partially (locally) activated.

FIG. 23 also shows how the fields of view of imaging modules 1804 may at least partially overlap so that if an object such as object 2304 moves out of the FOV of one imaging module (e.g., to a position 2306 as indicated by arrow 2305), another imaging module may be used to detect and track the object at its new location.

In some embodiments, images captured using imaging modules 1804 (e.g., using infrared imaging modules 100) may also be used to determine approximate distances to detected objects such as object 2304. If desired, alert components 1702 may be used to alert the wearer of device 1700 to the distance of the object in addition to the angular position of the object. For example, alert components 1702 may be operated with an intensity that depends on the distance to the object as shown in FIG. 24.

Figure 24:
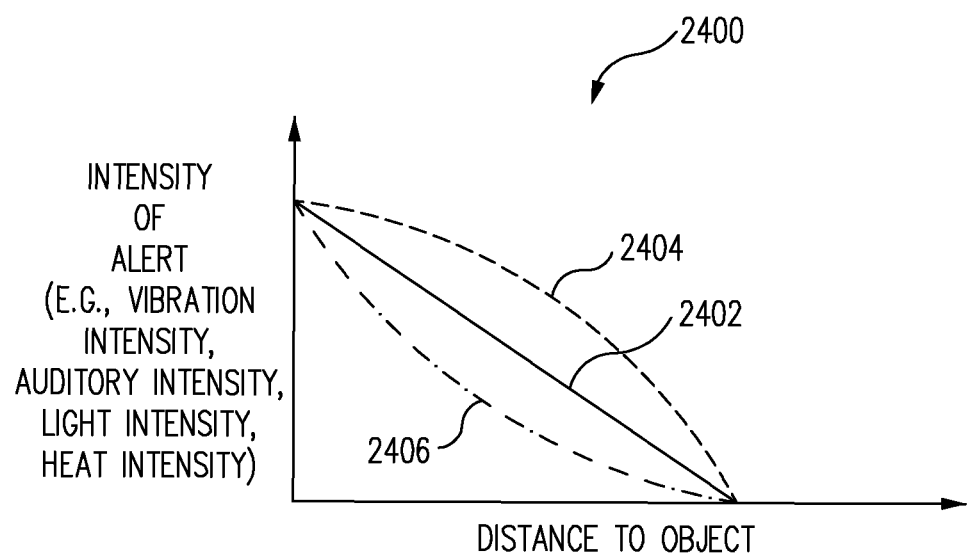
FIG. 24 illustrates a graph showing how an alert component may provide alerts of an intensity that is based on the distance to a detected object in accordance with an embodiment of the disclosure.
Figure 25:
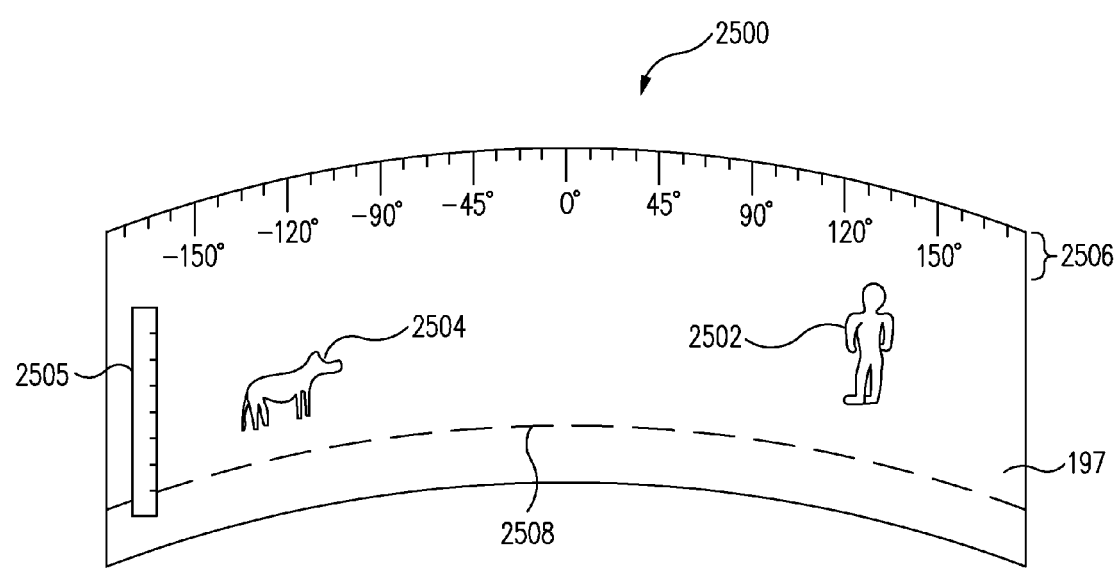
FIG. 25 illustrates information that may be displayed on a display of a wearable imaging device showing images of detected objects at various locations in accordance with an embodiment of the disclosure.

In the example of FIG. 24, graph 2400 shows possible dependencies of the intensity of an alert to the detected distance to an object such as a person or an animal in thermal and/or visible light images captured by imaging modules 1804. As indicated by line 2402, an alert may have an intensity (e.g., a vibration intensity, an auditory intensity (volume), a light intensity (brightness), or a heat intensity (temperature)) that is inversely proportional to the distance to the object. However, this is merely illustrative. If desired, the alert intensity may have a dependence on object distance of the type indicated by curves 2404 or 2406 or may have any other suitable dependence on the object In yet another example, alerts that can be generated for a wearer of a wearable imaging device 1700 such as a multidirectional threat monitoring helmet include user-viewable images (e.g., thermograms) of a scene captured by imaging modules 1804. FIG. 25 shows a portion of display 197 that is displaying user-viewable image 2500. Wearable imaging device 1700 (e.g., processor 195) may be configured to convert thermal images using appropriate methods and algorithms. In one embodiment, the radiometric data (e.g., temperature data) contained in the pixels of the thermal images may be converted into gray-scaled or color-scaled pixels to construct an image such as image 2500 that can be viewed by a person. User-viewable thermal image 2500 may optionally include a legend or scale such as scale 2505 that indicates the approximate temperature of corresponding pixel color and/or intensity and an angular scale such as scale 2506 that indicates the location of detected objects such as person 2502 and/or animal 2504. Such user-viewable images may be viewed by a user (e.g., a soldier, a law-enforcement officer, or a hunter) to visually determine the location of potential threats even in dark environments (e.g., at night).

If visible light images of the scene are available (e.g., captured by visible light camera 1406), processor 195 may be configured to superimpose, fuse, blend, or otherwise combine the thermal images and the visible light images to generate user-viewable image 2500 having a higher definition and/or contrast. For example, processor 195 may be configured to generate images 2500 that are combined images including radiometric data and/or other infrared characteristics corresponding to scene but with significantly more object detail (e.g., contour and/or edge detail) and/or contrast than typically provided by the thermal or visible light images alone, as further described herein. In another example, images such as image 2500 may be combined images that include radiometric data and visible light characteristics (e.g., a visible spectrum color) corresponding to one or more objects (e.g., a person) in scene, as described for appropriate embodiments disclosed in various patent applications referenced herein such as, for example, U.S. Patent Application Nos. 61/473,207, 61/746,069, 61/746,074, 61/792,582, 61/793,952, Ser. No. 12/766,739, 13/105,765, or 13/437,645, or International Patent Application No. PCT/EP2011/056432, or others as appropriate. Combined images generated in these examples may provide sufficient radiometric data, edge detail, and contrast to allow easier recognition and/or interpretation of the presence, location, and position of a detected person 2502 or animal 2504.

As shown in FIG. 25, in some embodiments, wearable imaging device 1700 may allow a user to define a virtual boundary 2508. A user may define virtual boundary 2508 through, for example, an interaction with a control panel, a GUI presented on display 197, or other input component. Virtual boundary 2508 may be defined by a user to delineate an area where it may be unsafe or otherwise undesirable for an approaching person to enter. For example, alerts may be generated by device 1700 if a person enters the area inside virtual boundary 2508. In other embodiments, the detection may be performed using one or more image analysis operations (e.g., video analytics), which may include scene reconstruction operations, object tracking operations, and/or virtual tripwire detection operations. The example of a virtual boundary is merely illustrative. If desired, device 1700 may generate an alert when a person (or animal or other object) is detected at any location.

Figure 26:
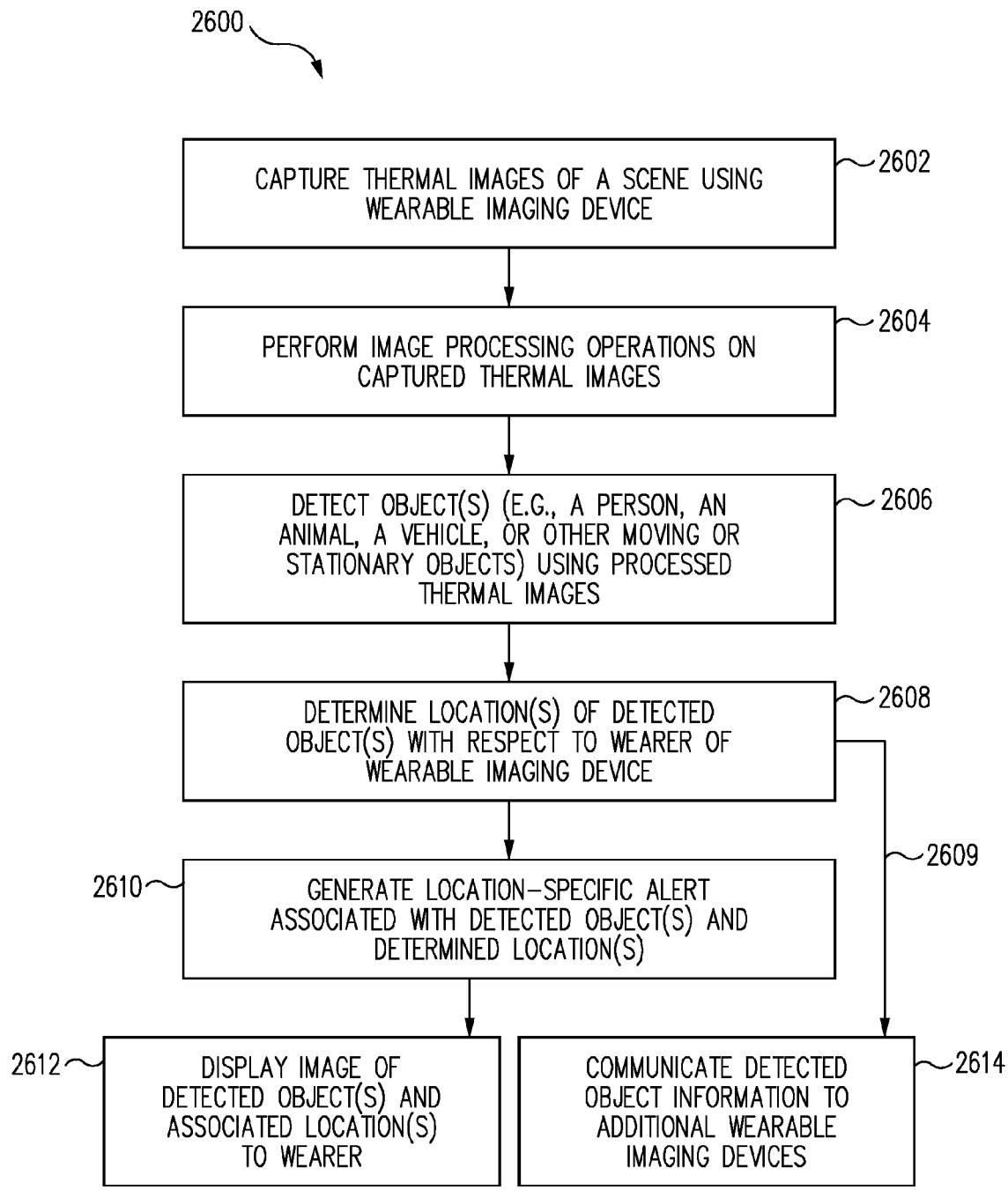
FIG. 26 illustrates a process for monitoring an environment using a wearable imaging device in accordance with an embodiment of the disclosure.

Referring now to FIG. 26, a flowchart is illustrated of a process 2600 for detecting objects and alerting a wearer using a wearable imaging device such as wearable imaging device 1700.

At block 2602, thermal images (e.g., images containing pixels with radiometric data) of a scene may be captured by one or more infrared imaging modules (e.g., infrared imaging modules 100 disposed around a wearable structure such as helmet 1802). The captured thermal images may be radiometrically calibrated thermal images as described above in connection with infrared imaging module 100. If desired, visible light images may also be captured at block 2602 using visible light cameras 1406 on a wearable structure such as helmet 1802.

At block 2604, processing operations may be performed on the captured thermal images. Processing operations may include NUC corrections, other noise corrections, calibration operations, smoothing operations, filtering operations, edge detection operations, perspective calibration operations or other image processing operations. Additional processing operations may also be performed on visible light images optionally captured at block 2602. Is some embodiments, image processing operations performed at block 2604 may include combining or fusing thermal images and visible light images as described above in connection with FIGS. 14 and 16 (as examples). NUC correction processes may be performed on the captured the thermal images to remove noise therein, for example, by using various NUC techniques disclosed herein.

Also, in some embodiments, the captured thermal images may be scaled and/or perspective calibrated. Scaling and perspective calibration operations may be performed manually or automatically using scaling or perspective calibration data stored in memory 196

At block 2606, one or more objects such as a person, an animal, a vehicle, or other moving or stationary objects may be detected using the processed thermal images. Detecting the objects may include identifying image pixels in the thermal images that correspond to the temperature of a person or an animal, identifying image pixels that correspond to exhaled gasses, or otherwise identifying characteristics of an image that correspond to the desired object to be detected.

For example, various analysis and processing operations may be performed on the captured thermal images to detect and track objects such as a person, and determine various attributes associated with the detected object and/or the scene. In one embodiment, regions of contiguous pixels having temperature values in a specific range may be detected from radiometrically calibrated thermal images for detection and of the object. For example, the detection operation may differentiate a region (or a "blob") having a surface temperature distribution that is characteristic of a human. The thermal images and the blob detected therein may be further processed and/or analyzed, for example, by performing various filtering operations and analyzing the size, shape, and/or thermal characteristics of the blobs, to ascertain the detection of the person and to further localize the person. In some embodiments, features of a person such as face and facial features may also be detected. As described above with respect to FIG. 15, various features of a person (e.g., facial features such as the eyes, mouth, and nostrils, clothed portions, or objects the person may be holding) generally exhibit various corresponding temperatures. Thus, in one example, filtering operations such as dilation and threshold filtering performed on the detected blob may be utilized to further localize the features. Also, the size, shape, and/or radiometric properties of the localized features may be further analyzed, if needed, to ascertain the detection of the features.

In another embodiment, the thermal images may be analyzed to detect one or more candidate foreground objects, for example, using background modeling techniques, edge detection techniques, or other foreground object detection techniques suitable for use with thermal images. The radiometric properties (e.g., surface temperature distribution) of the candidate objects may then be analyzed to determine whether they correspond to those of person that may be present in the scene. For example, rocks or trees may initially be detected as a candidate foreground object, but radiometric properties of the objects may then quickly reveal that it does not have a surface temperature distribution characteristic of a person and thus is not a person. As this example shows, object detection using the thermal images may be less susceptible to false detection of spurious objects compared with object detection techniques using visible light images. The size and shape of the candidate objects may also be analyzed, so that the detection may be ascertained based on the size, the shape, and the radiometric properties of the detected candidates. As described above, further processing and analysis operations may be performed if needed to localize and track the features of the person.

In one aspect of this embodiment, background modeling techniques may be used to detect objects in the scene. Because the background of the scene rarely changes and because thermal images are generally insensitive to changing lighting conditions, a background model (e.g., pixels that belong to a background) may be constructed with high accuracy, and a region of pixels different from the background (also referred to as a "region of interest") may easily be distinguished as a candidate foreground object. As described above, the radiometric properties of such a region of interest (ROI) may then be analyzed to further ascertain whether the detected ROI likely represent a person.

In various embodiments, the various processing and analysis operations described for block 2606 may be omitted or included, and may be performed in any other order as appropriate for detecting a person. For example, in some embodiments, detecting a warm "blob" in the thermal images may be sufficient to detect and track a person in a scene, whereas in other embodiments various thermal image analytics may be performed in combination to increase the accuracy of the detection.

In some embodiments, if visible light images are available (e.g., captured by visible light camera 1406), operations for block 2606 may additionally or alternatively involve performing suitable face detection and tracking algorithms on the visible light images or combined images of the visible light images and the thermal images. If the detection and tracking of the face and facial features are performed using the visible light images, operations for block 2606 may further involve converting pixel coordinates of the tracked face and facial features in the visible light images to corresponding pixel coordinates in the thermal images. Other appropriate techniques for detecting objects in the thermal images by analyzing the thermal images, visible light images, and/or combined images may also be utilized for block 2606.

At block 2608, the location of one or more detected objects (e.g., a detected person, more than one detected person, a detected animal, etc.) may be determined. Determining the location of a detected object may include determining which of several imaging modules captured an image in which the object was detected. In some embodiments, determining the location of the detected object may include determining the location of the object within an image captured by a given imaging module in order to further localize the determined location. Determining the location of the object within a captured image may include determining which pixels in the image include the object. Determining the location of the detected object may include determining an angular position of the object in a reference frame of the wearer of the wearable imaging device. For example, a reference frame of the wearer may have an angular position of zero degrees for forward locations directly in front of the wearer. In this example, an object behind the wearer may have an angular position of plus or minus 180 degrees. However, this is merely illustrative. If desired, angular positions of detected objects may be determined in any suitable reference frame or coordinate system such as a reference frame that is fixed to the physical environment surrounding the wearer.

Determining the location of the detected object may also include determining a distance to the object from the wearable imaging device. Determining the distance to the object may include determining a size of the object in an image, determining a type of object (e.g., a human), determining a typical size for that type of object, and computing a distance based on the size of the object in the image and the typical size of the object. Determining the distance to the object may include determining the size and type of other objects such as background objects with known or typical sizes in captured thermal and/or visible images. Determining the distance to the object may include determining the distance to the object using stored scale and/or perspective calibration data.

In some embodiments, additional object information may be determined at block 2608 by further analysis and processing and/or during the processing and analysis performed for detection. For example, the approximate body temperature, the approximate ambient temperature, and the posture of a detected person may be determined by analyzing and processing the thermal images as described above in connection with FIGS. 17-20 (as examples).

At block 2610, an alert such as a location-specific alert associated with detected objects and their determined locations may be generated. Location-specific alerts may be generated using alert components 1702 as described above in connection with FIGS. 17-25 (as examples). For example, an alert component that is co-located with (e.g., adjacent to) an imaging module with which the object was detected may be operated to alert the wearer of a wearable imaging device of the presence of the detected object in the direction monitored by that imaging module. For example, a soldier wearing a multidirectional threat monitoring helmet may feel a vibration, hear a noise, see a light, or feel heat (as examples) on the right side of their head that indicates that a potential threat has been detected using thermal images captured using an infrared imaging module on the right side of the helmet. Generating the location-specific alert may include generating an alert using a single alert component or more than one alert component. Generating an alert using multiple alert components may allow the wearable imaging device to generate an alert for a wearer that seems to be generated at a location between the multiple alert components.

If desired, the location-specific alert can have an intensity that indicates the distance to the detected object as described above in connection with, for example, FIG. 24. For example, a low intensity vibration or a gentle heat may indicate a detected threat at a relatively large distance and a high intensity vibration or an intense heat may indicate a detected threat at a relatively close distance.

As further described above, the various attributes of thermal and/or visible light images may be further analyzed and/or processed to generate alerts for a wearer to warn of a particular posture, a posture change, a change in proximity, a violation of a virtual perimeter, or other suitable attributes.

At block 2612, a user-viewable image of a detected object (or a scene containing a detected object) may be generated and displayed to the wearer. In one embodiment, the user-viewable image may be generated by converting thermal images using appropriate methods and algorithms. For example, thermal data (e.g., temperature data) contained in the pixels of the thermal images may be converted into gray-scaled or color-scaled pixels to construct images that can be viewed by a person. The user-viewable thermal images may optionally include legends or scales that indicate the approximate temperatures and/or locations of detected objects as described above in connection with, for example, FIG. 25. Generating the user-viewable image may include stitching together image data from multiple imaging modules, combining thermal and visible light images, or otherwise processing or combining image data to generate user viewable images. Displaying the user-viewable images may include providing the user-viewable images to a display of the wearable imaging system, or to an external display associated with another system.

As indicated by arrow 2609, at block 2614, detected object information (e.g., a detected object notification, a detected object location, a detected object type, a detected object distance, a detected object feature, a detected object posture, a user-viewable image of a detected object, or other information associated with a detected object such as a person) may be communicated to other wearable imaging devices such as other multidirectional threat monitoring helmets. For example, a group of soldiers may be patrolling an area at night when a potential threat is detected using an imaging module on the left side of a particular soldier's helmet. That soldier may receive an alert from one or more alert components on the left side of his or her helmet and an alert notification may be transmitted wirelessly to the multidirectional threat monitoring helmets worn by other soldiers in the group. If desired, the multidirectional threat monitoring helmets of the other soldiers may also generate an alert for their wearers that indicates the presence and location of the detected object.

In one embodiment, the generated monitoring information may be converted, wrapped, structured or otherwise formatted for data exchange with other wearable imaging devices using suitable application layer protocols (e.g., Simple Object Access Protocol (SOAP), Hypertext Transfer Protocol (HTTP)) or a proprietary data exchange format.

Figure 27:
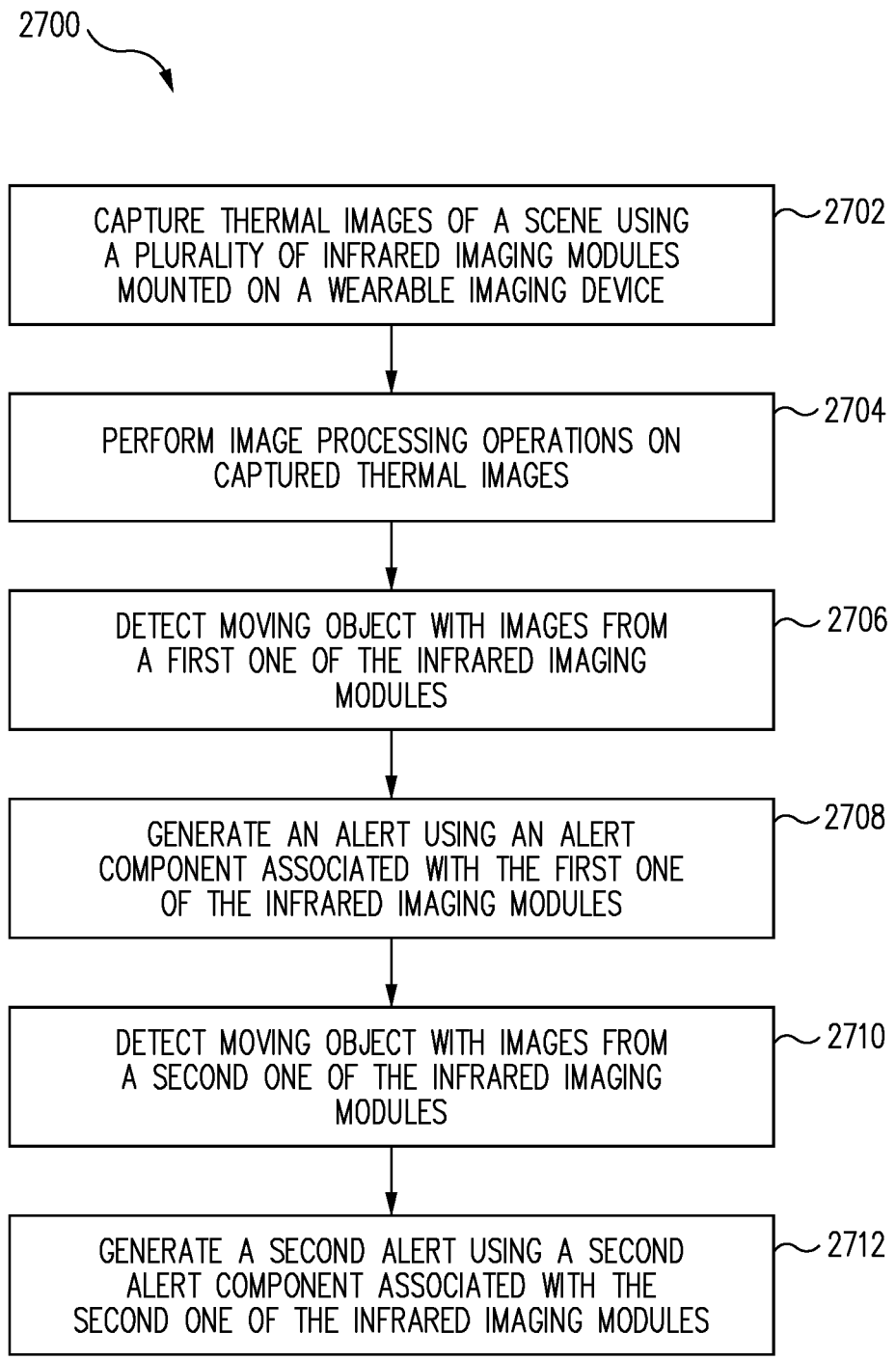
FIG. 27 illustrates a process for monitoring a moving object using a wearable imaging device in accordance with an embodiment of the disclosure.

Referring now to FIG. 27, a flowchart is illustrated of a process 2700 for monitoring moving objects and alerting a wearer to the location of the moving object using a wearable imaging device such as wearable imaging device 1700.

At block 2702, thermal images of a scene may be captured using a plurality of infrared imaging modules mounted on a wearable structure of a wearable imaging device such as a multidirectional threat monitoring helmet.

At block 2704, imaging processing operations of the type described above in connection with block 2604 of FIG. 26 may be performed on the captured thermal images.

At block 2706, a moving object (e.g., a moving person or animal) may be detected using thermal images from a first one of the infrared imaging modules. A moving object may be detected in thermal images as described above in connection with block 2606 of FIG. 26.

At block 2708, an alert such as a location-specific alert may be generated using an alert component of the wearable imaging device that is associated with the first one of the infrared imaging modules. For example, an alert may be generated using an alert component that is located near the position of the first one of the infrared imaging modules.

At block 2710, the moving object may be detected using images from a second one of the infrared imaging modules. For example, the moving object may move out of the field of view of the first imaging module and into the field of view of the second imaging module.

At block 2712, a second alert such as a second location-specific alert may be generated using a second alert component of the wearable imaging device that is associated with the second one of the infrared imaging modules. For example, a second alert may be generated using a second alert component that is located near the position of the second one of the infrared imaging modules (e.g., located closer to the second one of the infrared imaging modules than to the first one of the infrared imaging modules).

Although various image processing techniques have been described, any of the various processing techniques set forth in any of the patent applications referenced herein may be used. For example, in some embodiments, visible images and/or thermal images may be blended or otherwise combined in accordance with any of the techniques set forth in U.S. Patent Application Nos. 61/473,207, 61/746,069, 61/746,074, 61/792,582, 61/793,952, Ser. No. 12/766,739, 13/105,765, or 13/437,645, or International Patent Application No. PCT/EP2011/056432, or others as appropriate.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus, comprising:
   a wearable structure;
   a plurality of infrared imaging modules mounted around a circumference of the wearable structure, wherein each of the plurality of infrared imaging modules is configured to capture a thermal image of a scene;
   a plurality of alert components mounted around the circumference of the wearable structure; and
   one or more processors in communication with the plurality of infrared imaging modules, wherein the one or more processors are configured to:
     detect an object in the scene using the thermal images captured by the plurality of infrared imaging modules;
     determine a position of the detected object based on which of the plurality of infrared imaging modules captured the thermal images with the detected object;
     select at least one of the plurality of alert components based at least on the determined position; and
     generate a location-specific alert for a wearer of the wearable structure by operating the selected at least one of the plurality of alert components, wherein the location-specific alert is associated with the position of the detected object.

2. The apparatus of claim 1, wherein the alert component comprises a haptic component.

3. The apparatus of claim 1, wherein the alert component comprises an audio component.

4. The apparatus of claim 1, wherein the alert component comprises a heat-generating component.

5. The apparatus of claim 1, wherein the one or more processors are further configured to correct the thermal image according to a non-uniformity correction process using an intentionally blurred thermal image.

6. The apparatus of claim 1, wherein each alert component is associated with one or more of the plurality of infrared imaging modules based at least on a location of the alert component on the wearable structure, wherein the position of the detected object comprises a distance and/or angular position determined based on the thermal images having the detected object.

7. The apparatus of claim 6, wherein the distance comprises a distance between the detected object and the wearable structure, and wherein an intensity of the location-specific alert is based on the distance between the detected object and the wearable structure.

8. The apparatus of claim 1, wherein the wearable structure comprises a head piece for the wearer, wherein the plurality of infrared imaging modules is collectively configured to capture a 360 degree field of view, and wherein each of the plurality of infrared imaging modules is configured to capture a portion of the 360 degree field of view.

9. The apparatus of claim 8, wherein the plurality of infrared imaging modules comprises a filter selected from the group consisting of a short-wave infrared filter, a mid-wave infrared filter, a long-wave infrared filter, and a narrow-band filter, wherein the one or more processors are configured to generate an image based on the captured 360 degree field of view, the apparatus further comprising:
a display disposed on the wearable structure, the display configured to display the generated image.

10. The apparatus of claim 1, further comprising at least one non-thermal imaging module mounted on the wearable structure, and wherein the one or more processors are configured to generate an image comprising high-spatial frequency content from an image generated using the one non-thermal imaging module fused with the thermal image.

11. The apparatus of claim 1, wherein the one or more processors are further configured to:
determine a distance and an angular position of the detected potential threat based on the determined position;
detect a change in the distance or the angular position; and
adjust the intensity of the location-specific alert based on the detected change.

12. The apparatus of claim 1, wherein the one or more processors are further configured to determine a posture of the object, and wherein the one or more processors are configured to generate the location-specific alert when the object is detected and when the posture of the object is an alert-triggering posture.

13. The apparatus of claim 1, wherein the wearable structure comprises a flap structure, and wherein the flap structure comprises a display configured to display a thermal image captured by at least one of the plurality of infrared imaging modules.

14. The apparatus of claim 1, wherein the object comprises carbon dioxide.

15. A method, comprising:
capturing, at a respective focal plane array (FPA) of each of a plurality of infrared imaging modules, a thermal image of a scene within a respective field of view (FOV) of the respective infrared imaging module, wherein each infrared imaging module is mounted on a wearable structure;
detecting an object in the thermal image captured by the plurality of infrared imaging modules;
determining a position of the detected object based at least on which of the plurality of infrared imaging modules captured the thermal images with the detected object;
selecting at least one of a plurality of alert components based at least on the determined position, wherein the plurality of alert components is mounted on the wearable structure; and
generating a location-specific alert for a wearer of the wearable structure by operating the selected at least one of the plurality of alert components, wherein the location-specific alert is associated with the position of the detected object.

16. The method of claim 15, wherein the position comprises an angular position and a distance between the detected object and the wearable structure, and wherein an intensity of the location-specific alert is based on the distance between the detected object and the wearable structure.

17. The method of claim 15, wherein each of the plurality of infrared imaging modules has a respective location on the wearable structure and wherein the generating the location-specific alert comprises generating a vibration at the location of the one of the plurality of infrared imaging modules.

18. The method of claim 15, further comprising:
displaying an image of the detected object to the wearer; and
communicating detected object information associated with the detected object to an external device.

19. A multidirectional threat monitoring helmet comprising:
a protective head covering structure;
a plurality of infrared imaging modules mounted around a circumference of the protective head covering structure, each having a field of view that includes a portion of a scene;
a plurality of alert components mounted around the circumference of the protective head covering structure; and
one or more processors coupled to the plurality of infrared imaging modules and the plurality of alert components, wherein the one or more processors are configured to:
detect a potential threat using images captured by the plurality of infrared imaging modules;
determine a position of the detected potential threat based at least on which of the plurality of infrared imaging modules captured the images with the potential threat;
select at least one of the plurality of alert components based at least on the determined position; and
generate an alert associated with the potential threat using the selected at least one of the plurality of alert components.

* * * * *